(12) United States Patent
Elder et al.

(10) Patent No.: US 7,130,490 B2
(45) Date of Patent: Oct. 31, 2006

(54) ATTENTIVE PANORAMIC VISUAL SENSOR

(76) Inventors: James H. Elder, 116 Grenadier Road, Toronto, Ontario (CA) M6R 1R4; Yuqian Hou, 30 Bedle Avenue, Toronto, Ontario (CA) M2H 1K8; Ronen Goldstein, 56 Greenwin Village Road, Willowdale, Ontario (CA) M2R 2S1; Fadi Dornaika, Troskaregatan 21, Linkoping, 583 33 (SE)

( * ) Notice: Subject to any disclaimer, the term of this patent is extended or adjusted under 35 U.S.C. 154(b) by 1071 days.

(21) Appl. No.: 10/143,848

(22) Filed: May 14, 2002

(65) Prior Publication Data
US 2003/0026588 A1 Feb. 6, 2003

Related U.S. Application Data

(60) Provisional application No. 60/294,584, filed on Jun. 1, 2001, provisional application No. 60/290,358, filed on May 14, 2001.

(51) Int. Cl.
G06K 9/32 (2006.01)
(52) U.S. Cl. ............... 382/294; 382/284; 382/299; 348/95; 348/584
(58) Field of Classification Search ........... 382/284, 382/289, 293, 294, 299; 348/36, 575, 584
See application file for complete search history.

(56) References Cited

U.S. PATENT DOCUMENTS 5,980,044 A * 11/1999 Cannon et al. ............. 353/30
6,078,701 A * 6/2000 Hsu et al. .................. 382/294
6,278,466 B1 * 8/2001 Chen ......................... 345/473
6,307,550 B1 * 10/2001 Chen et al. ................ 345/418
6,631,240 B1 * 10/2003 Salesin et al. ............. 386/68

* cited by examiner

Primary Examiner—Samir Ahmed
Assistant Examiner—Yosef Kassa
(74) Attorney, Agent, or Firm—Lynn C. Schumacher; Hill & Schumacher

(57) ABSTRACT

The present invention provides a process for accurately combining low-resolution and high-resolution video streams into a single seamless display to a human observer. The present invention also provides a method for the smooth blending of high- and low-resolution video boundary. In order to create an effective visual display, it is advantageous that the boundary between high- and low-resolution video not be overly distracting and irregular. The present method to reduce distractions from the quadrilateral boundary between low-and high-resolution video by smoothly blending the two in an annular region between the two. This results in a much more visually pleasing, effective display. The present invention also provides a method for progressively mosaicking high resolution imagery over a low resolution image captured by our panoramic sensor. The observer is continuously presented with a low-resolution panoramic image of a remote scene, and this image is updated with high-resolution imagery from the high-resolution sensor, at selected locations of interest, as they are available.

16 Claims, 21 Drawing Sheets

(a)

(b)

(c)

(a)

(b)

ATTENTIVE PANORAMIC VISUAL SENSOR

CROSS REFERENCE TO RELATED U.S. PATENT APPLICATION

This patent application relates to U.S. provisional patent application Ser. No. 60/290,358 filed on May 14, 2001, entitled ATTENTIVE PANORAMIC VISUAL SENSOR, and U.S. provisional patent application Ser. No. 60/294,584 filed on Jun. 1, 2001, entitled ATTENTIVE PANORAMIC SENSING FOR VISUAL TELEPRESENCE.

FIELD OF THE INVENTION

The present invention relates to a panoramic visual sensor system and more particularly the present invention provides a panoramic visual sensor system which can record at high and low resolutions and combine the two into a single seamless display.

BACKGROUND OF THE INVENTION

Sensor and bandwidth constraints limit the spatial resolution and field-of-view (FOV) achievable in any visual system. In many applications (e.g. surveillance, teleconferencing), it is desirable to have both large field of view (e.g. to survey a panoramic area) and high resolution (e.g. to identify certain types of activity or to recognize faces).

Over the last ten years there has been increasing interest in the application of panoramic sensing to computer vision ((Danilidis & Geyer, 2000), (Hicks & Bajcsy, 2000), (Ishiguro, Yamamoto, & Tsuji, 1992), (Nayar, 1997), (Svoboda, Pajdla, & Hlavac, 1998), (Yagi & Kawato, 1990), (Yin & Boult, 2000)). Potential applications include surveillance, object tracking, and telepresence ((Haritaoglu, Harwood, & Davis, 1998), (Kanade, Collins, Lipton, Burt, & L. Wixson, 1998)). Most existing panoramic sensors are catadioptric, i.e. the sensor is composed of a camera and a curved mirror arranged so that the resulting system has a single viewpoint. It has been shown ((Danilidis & Geyer, 2000)) that the projection obtained with a catadioptric sensor with a single viewpoint is equivalent to the projection on a sphere followed by a perspective projection. Catadioptric sensors allow panoramic images to be captured without any camera motion. However, since a single sensor is used for the entire panorama, the resolution of such images may be inadequate for many applications. Switching from the 14 deg FOV of a typical lens to the 360 deg FOV of a panoramic camera results in a 26-fold reduction in linear resolution. For a standard 768×494 NTSC camera, horizontal resolution is reduced to roughly 0.5 deg/pixel, a factor of 60 below human foveal resolution.

There has been considerable work on space-variant (foveated) sensor chips ((Ferrari, Nielsen, Questa, & Sandini, 1995), (Pardo, Dierickx, & Scheffer, 1997)). However, since the number of photoreceptive elements on these sensors is limited, they do not provide a resolution or field of view advantage over traditional chips. Moreover, it is not clear how such sensors could be used to achieve a panoramic field of view over which the fovea can be rapidly deployed. A more common solution to the FOV/resolution tradeoff is to compose mosaics from individual overlapping high-resolution images that form a covering of the viewing sphere ((Irani, Anandan, & Hsu, 1995), (Kumar, Anandan, Irani, Bergen, & Hanna, 1995), (Szeliski, 1994), (Szeliski & Shum, 1997)).

These images can be obtained by a single camera that can rotate about its optical centre. Such a system is useful for recording high-resolution "still life" panoramas, but is of limited use for dynamic scenes, since the instantaneous field of view is typically small. An alternative is to compose the mosaic from images simultaneously recorded by multiple cameras with overlapping fields of view. The primary disadvantage of this approach is the multiplicity of hardware and independent data channels that must be integrated and maintained. For example, a standard 25 mm lens provides a field-of-view of roughly 14×10 degrees. Allowing for 25% overlap between adjacent images to support accurate mosaicking, achieving this resolution over a hemispheric field of view would require roughly 260 cameras.

The human visual system has evolved a bipartite solution to the FOV/resolution tradeoff. The field of view of the human eye is roughly 160×175 deg—nearly hemispheric. Central vision is served by roughly five million photoreceptive cones that provide high resolution, chromatic sensation over a five-degree field of view, while roughly one hundred million rods provide relatively low-resolution achromatic vision over the remainder of the visual field ((Wandell, 1995)). The effective resolution is extended by fast gaze-shifting mechanisms and a memory system that allows a form of integration over multiple fixations ((Irwin & Gordon, 1998)).

Variations on this architecture are found in other species. Many insects, for example, have panoramic visual systems ((Moller, Lambrinos, Pfeifer, & Wehner, 1998)). For example, the springing spider has four eyes that capture movement over the entire viewing sphere and two small field-of-view high resolution eyes used in predation and mating.

There have been some recent attempts to integrate high- and low-resolution imaging in artificial sensors. In June, 1996, Hughes Electronics filed a patent (U.S. Pat. No. 5,710,661) Integrated panoramic and high resolution sensor optics, which describes an optical apparatus that monitors an entire panorama in low resolution, and simultaneously monitors a selected portion of the panorama in high resolution. A drawback to this system is that both high and low resolution data are recorded on the same sensor, limiting both foveal and panoramic resolution.

In April, 1998, OmniView Inc. filed a patent (WO9846014A1), Method and apparatus for inserting a high resolution image into a low resolution interactive image to produce a realistic immersive experience. This patent describes a process of inserting a high resolution image into a low resolution display to produce a more convincing virtual reality experience. This patent was awarded in October, 1998. There are other related patents on the blending of high resolution and low resolution imagery in visual displays (e.g. US1984000576432, Filed February 1984, Granted January 1987).

Geisler and Perry (1998) have demonstrated a wavelet-based video encoding system that progressively subsamples the video stream at image points distant from the viewer-defined region of interest. Recent work with saccade-contingent displays (Loschky & McConkie, 1999) has shown that video data viewed in the periphery of the human visual system can be substantially subsampled with negligible subjective or objective impact. While our attentive panoramic sensor is not eye-slaved, these prior results do suggest that attention-contingent sampling for human-in-the-loop video is feasible and potentially useful.

Yin and Boult (2000) have developed a multiresolution panoramic image sensor based on stacking multiple parabolic mirrors of different sizes. Since the entire pyramid is sensed by a single sensor, this technique provides efficient access to very high resolution data, but does not solve the problem of obtaining and integrating high-resolution data with data at panoramic resolution.

Mann and Picard (1997) have investigated correlation-based methods for computing homographies to fuse images of different resolution taken by the same camera at different focal lengths, but do not address the problem of fusing images over much greater resolution differences from different cameras in real time.

SUMMARY OF INVENTION

The present invention provides a process for accurately combining low-resolution and high-resolution video streams into a single seamless display to a human observer.

The present invention also provides a method for the smooth blending of high- and low-resolution video boundary. In order to create an effective visual display, it is advantageous that the boundary between high- and low-resolution video not be overly distracting and irregular. The present method to reduce distractions from the quadrilateral boundary between low-and high-resolution video by smoothly blending the two in an annular region between the two. This results in a much more visually pleasing, effective display.

The present invention also provides a method for progressively mosaicking high resolution imagery over a low resolution image captured by our panoramic sensor. The observer is continuously presented with a low-resolution panoramic image of a remote scene, and this image is updated with high-resolution imagery from the high-resolution sensor, at selected locations of interest, as they are available. These locations may be defined by the observer, or automatically by an artificially intelligent 'interest operator'. Local high resolution imagery will not be immediately replaced by low-resolution imagery from the panoramic sensor. Rather, we have invented a kind of artificial memory, that causes the high-resolution data to remain in the display even as the high-resolution sensor is directed toward other locations. The display duration of foveal images from past fixations is determined by a memory parameter. At one extreme, previous foveal data are immediately replaced by more recent low resolution data from the peripheral sensor. At the other extreme, a sequence of fixations builds up a persistent high resolution mosaic. In intermediate modes, foveal data from previous fixations gradually fade into more recent low-resolution data. Thus in this invention there is provided a general method for controlling the tradeoff between spatial resolution and temporal resolution in a remote sensing and display apparatus.

The present invention also provides methods for the static and dynamic estimation of homography mapping high-resolution to panoramic coordinates, allowing accurate fusion of data. To combine high- and low-resolution data for automatic interpretation or display, the data must be accurately registered. Registration is made non-trivial by parallax due to the displacement between the optical centres of the two sensors. To solve this problem the present invention provides a method to approximate the mapping between foveal and panoramic images by a 2D projective mapping, i.e. a homography. This is equivalent to the assumption that within the field-of-view of the fovea, the scene is approximately planar. Solving for the parameters of the projective matrix thus amounts to defining the attitude of the local scene plane. In general, this plane may be different in each gaze direction, and thus for a given static scene one can assume that the mapping between foveal and panoramic coordinates is defined by a 2D (pan/tilt) map of 2D projective matrices.

One possible approach to this problem is to use a manual calibration procedure to estimate these homographies over a lattice of pan/tilt gaze directions, and then to interpolate over this table of homographies to estimate an appropriate homography given arbitrary pan/tilt coordinates. This method is suitable for distant or static scenes.

For close-range, dynamic scenes, these homographies are functions of time, and so cannot be pre-computed so for close-range scenes an alternative method is provided which gives a mapping that is both a function of space (direction in the viewing sphere) and time. The method involves coarse registration using parametric templates and Pearson correlation to estimate translation and scaling, and staged refinement to estimate photometric, affine parameters and then a full homography, using Pearson correlation.

In one aspect of the invention there is provided a method for simultaneously recording foveal and panoramic video streams and fusing the foveal and panoramic video streams into a single seamless display, the foveal video stream being recorded using a high-resolution video sensor and the panoramic video stream being recorded using a low-resolution video sensor, the method comprising the steps of:

a) unwarping a panoramic video stream from said low-resolution video sensor and transforming said foveal video stream from said high-resolution video sensor and said unwrapped panoramic video stream to common display coordinates;

b) fusing said transformed foveal video stream and said transformed unwrapped panoramic video stream; and c) displaying the fused video stream on a visual display means to produce a fused visual display.

In another aspect of the invention there is provided a method for reducing distractions from a quadrilateral boundary between low-and high-resolution video stream by smoothly blending the two in an annular region between the two, the high-resolution video stream being recorded using a high-resolution video sensor and the low-resolution video stream being recorded using a low-resolution video sensor, the method comprising the steps of:

a) computing an annular region inscribing a quadrilateral boundary of the high-resolution image, as projected in the coordinate frame of the panoramic sensor; and b) blending the high- and low-resolution video streams within this annular region to yield a smooth seamless display.

In another aspect of the invention there is provided a method for progressively mosaicking high-resolution imagery captured by a high-resolution video sensor over a low resolution image captured by a low-resolution panoramic video sensor, the method comprising the steps of:

a) timestamping and archiving high-resolution images from previous fixations of the high-resolution video sensor;

b) providing a formula defining a time decay memory parameter formula of high-resolution images from previous fixations of the high-resolution sensor;

c) adjusting the contrast of pixels from previous fixations of the high-resolution sensor according to said time decay memory parameter formula;

d) combining the contrast-adjusted high-resolution pixels with cren data from the low-resolution panoramic sensor; and e) adjusting the time decay memory parameter to trade off temporal and spatial resolution over a continuous range.

The present invention also provides a method for estimating static homographies mapping coordinates of a high-resolution video stream to panoramic coordinates, allowing accurate fusion of data for static or distant scenes, comprising the steps of:
a) construction of a planar calibration rig with well-defined, high-contrast corner features;
b) recording simultaneous low- and high-resolution video frames using a low-resolution panoramic video sensor and a high-resolution video sensor of a calibration rig at regular intervals over a field-of-view of the low-resolution panoramic sensor;
c) localizing corresponding points on the calibration rig in the high- and low-resolution images;
d) estimating a homography for each pan/tilt position of the high-resolution video sensor; and
e) interpolating over a resulting lattice of homographies to yield a homography relating high- and low-resolution coordinate frames at arbitrary pan/tilt angles.

This invention also provides a method for estimating dynamic homographies mapping high-resolution to panoramic coordinates, allowing accurate fusion of data for close-range, dynamic scenes, comprising the steps of:
a) providing a coarse registration using parametric templates over a discrete scale space on the high-resolution image and using Pearson correlation to estimate translation and scaling; and
b) providing a staged refinement for estimating photometric, affine parameters and then a full homography, using Pearson correlation.

In another aspect of the invention there is provided an apparatus for simultaneously recording high- and low-resolution video streams and combining these video streams into a single seamless display, comprising:
a) a low-resolution panoramic video sensor for recording low-resolution video streams;
b) a high-resolution video sensor for recording high-resolution video streams mounted on a motorized gimballed pan/tilt platform that permits the high-resolution sensor to be rotated about its optical centre toward any visual direction within the panoramic field of view of the low-resolution video sensor;
c) processing means for fusing the two video streams in real time;
d) processing means for displaying the fused video stream on a visual display means;
e) user-interface means that allows a human user to direct the high-resolution sensor by clicking on points of interest in the low-resolution portion of the display; and
f) processing means for detecting motion in the low-resolution video stream and directs the high-resolution sensor toward the moving object.

BRIEF DESCRIPTION OF THE DRAWINGS

The invention will now be described, by way of non-limiting examples only, reference being had to the accompanying drawings, in which:

FIG. 9(f) is only 40×30 pixels;

DETAILED DESCRIPTION OF THE INVENTION

In this patent there is disclosed an attentive panoramic sensor conceptually based upon the human foveated visual system, and we describe a framework for automatically combining high-resolution images with low resolution panoramas provided by an panoramic catadioptric sensor. The peripheral component of the system consists of a catadioptric video sensor that provides a panoramic FOV. The foveal component is a video pan/tilt camera with 14×10 deg FOV. Video streams from the two sensors are fused at 15 fps on a standard video display. Saccades (rotations of the pan/tilt sensor) may be initiated either manually by a human observer via mouse clicks on the display, or automatically by a motion localization algorithm. Memory parameters govern the tradeoff between the high spatial resolution of the foveal video stream, and the high temporal resolution of the panoramic stream. The system employs pre-calibrated homographies to register foveal and panoramic video data for static or long-range scenes, and a more sophisticated dynamic fusion algorithm for dynamic, close-range scenes.

Systems of this kind are useful in both autonomous and semi-autonomous applications. Events detected in the panoramic sensor may generate saccade commands to allow more detailed inspection/verification at foveal resolution. In telepresence applications, foveal data may provide the resolution required to see facial expressions, read text, etc., while the panoramic data may augment the sense of presence and situational awareness.

1) Hardware Design

Figure 1:
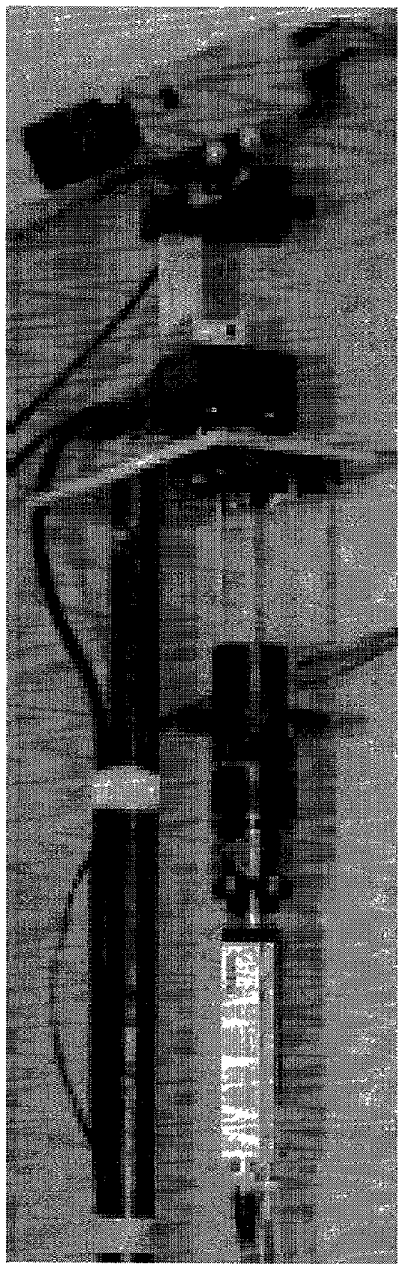
FIG. 1(a) is a photograph of an attentive panoramic sensor system in accordance with the present invention.
FIG. 1(b) shows a raw foveal image taken with the sensor system of Figure.
FIG. 1(c) shows a raw panoramic image taken with the sensor system of FIG. 1.
Figure 1:
Figure 1:

A non-limiting example of an attentive panoramic visual sensor constructed in accordance with the present invention is shown in FIG. 1(*a*). The panoramic component is a parabolic catadioptric sensor (Nayar, 1997) purchased from Cyclovision Technologies (now Remote-Reality). The parabolic mirror stands roughly 2 meters from the ground, facing down, and thus images the panoramic field. Panoramic images are captured through an orthographic lens system by a Pulnix TMC-7DSP colour CCD camera.

The foveal component consists of a Cohu 1300 colour CCD camera with a 50 mm Fujinon lens, mounted on a Directed Perception PTU-46-17.5 pan/tilt platform. As loaded, the platform travels at an average speed of roughly 60 deg/sec in both pan and tilt directions: typical saccades complete in 150 to 1200 msec. The platform has been modified so that both axes of rotation coincide approximately with the optical centre of the lens system, so that parallax between foveal images at different pan/tilt coordinates is minimized.

The optical centres of the two sensors are separated by 22 cm in the vertical direction. This means that a fixed system of coordinate transforms between the two sensors can be accurate only if viewing distance is large or if dynamic variations in depth are small relative to viewing distance. Since neither condition holds in our laboratory, we currently calibrate the system for intermediate distances and accept the misregistrations that occur at other depths.

Video processing, display and control are handled by a single-CPU 800 MHz Pentium III computer. The two colour 30 fps NTSC video streams are digitized by a 6-channel Data Translation DT3132 frame grabber card into two digital 640×480 video streams. The display is driven by an NVidia 64 MB GeForce2 GTS graphics card.

2) Foveal/Panoramic Fusion for Static or Distant Scenes

Coordinate Transformations

In the current prototype, we model the scene as static and piecewise planar, and approximate the correspondence between foveal and panoramic coordinate frames using a table of homographies indexed by the pan/tilt coordinates of the foveal sensor. We discuss our calibration procedure in the section entitled Calibration below. The system relies upon 4 different coordinate transformations (FIG. 2):

panorama→display
fovea→display
panorama→pan/tilt
display→pan/tilt

The first two transformations map the two video streams to common display coordinates.

The last two transformations map selected interest points from panoramic or display coordinates to pan/tilt coordinates used to effect a saccade.

Panorama/Display Transformation

The panorama/display coordinate transform is a fixed 3-parameter translation/scaling, so that the observer views the scene essentially in panoramic coordinates. In the present con-figuration we map a 256×128 pixel subimage from the upper half of the panorama to a 1280×640 pixel window in the display.

Fovea/Display Transformation

The fovea/display transformation is composed of fovea/panorama and panorama/display transformations. Calibration as discussed below yields a table of homography matrices, indexed by the pan/tilt coordinates of the foveal sensor platform, that are used to map foveal pixels to panoramic coordinates. Given an arbitrary pan/tilt index, the homography matrix is constructed by bilinearly interpolating the 8 parameters of the homography stored at neighbouring entries. The result is then mapped to display coordinates using the fixed panorama/display coordinate transform. The rectangular foveal image is thus mapped to a general quadrilateral in the display.

Panorama/Pan/Tilt Transformation

In addition to the table of homography parameters used for the fovea/panorama transformation, the calibration procedure yields a second table used for the panorama/pan/tilt transformation. This table provides the pan/tilt coordinates required for given panoramic coordinates to map to the centre of a foveal image. Thus the table can be used to centre the fovea at a point of interest automatically detected in the panorama.

Display/Pan/Tilt Transformation

The display/pan/tilt transformation is composed of a fixed translation/scaling display/panorama transformation and the panorama/pan/tilt transformation just described. This transformation is used to generate saccades to points of interest detected in the display by the observer.

Calibration

The system may be calibrated manually, using a simple calibration rig. Since the sensor used in the present study was located close to a corner of the room, the study was done in a 90×45 deg subfield located at the top of the panorama and facing out from the walls. Twenty-one (21) synchronous pairs of foveal/panoramic frames were captured over a 7×3 regularly spaced grid in pan/tilt space. The rig is positioned an intermediate distance from the sensor to optimize the working range of the coordinate transformations for the given environment. Twelve to sixteen (12–16) point pairs were manually localized in each foveal/panoramic image pair, and the corresponding least-squares homography is estimated using standard techniques. These data are used to form the fovea/panorama coordinate transformation, indexed by the pan/tilt coordinates of the foveal platform.

For each image pair obtained the projection of the foveal centre is stored into panoramic coordinates. This allows construction of a second table, indexed by panoramic coordinates, that provides the pan/tilt coordinates required to centre the fovea at a specific panoramic location. This table is used to generate saccades from human or machine attention algorithms.

3) Operation

Figure 2:
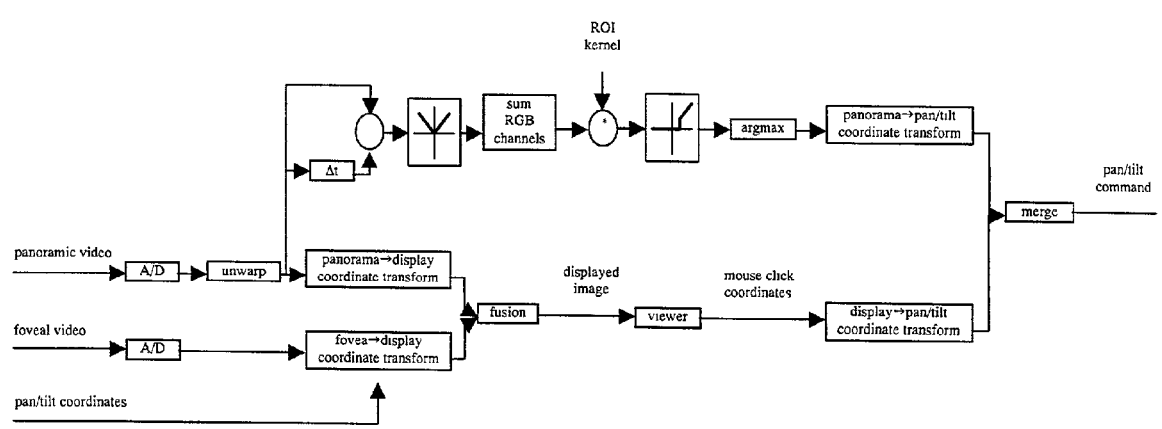
FIG. 2 shows a block diagram of the attentive panoramic sensor system.

FIG. 2 shows a schematic of how the foveal and panoramic video streams are processed, combined and displayed. The panoramic video stream is first unwarped by the CPU using for example Cyclovision software (Nayar, 1997) to form a 1024×256 colour video stream (FIG. 3($a$)). The two video streams are then transformed into common display coordinates prior to fusion or blending.

Figure 3:
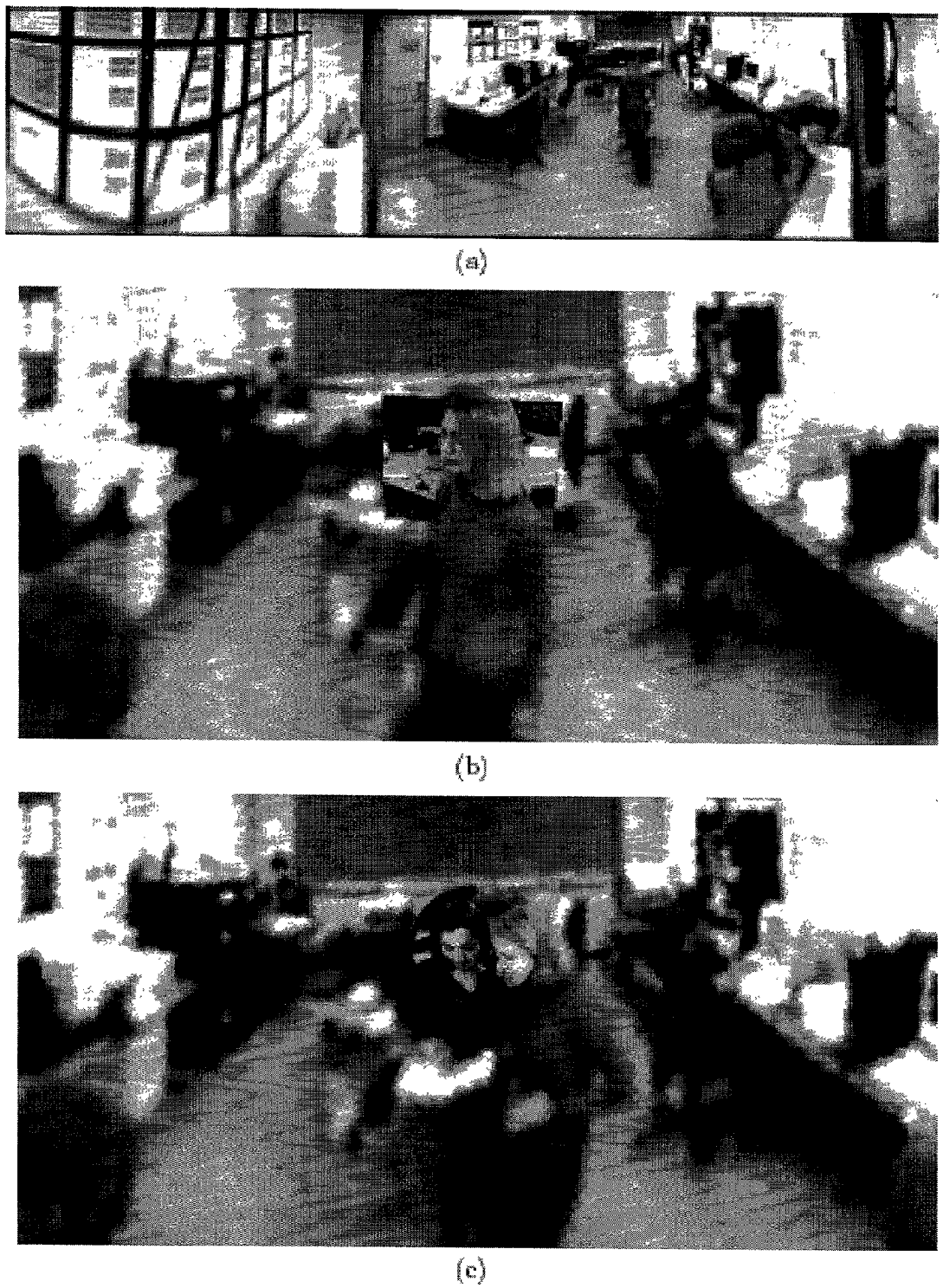
FIGS. 3: (a) Unwarped panoramic image. (b) Foveal/panorama fusion (c) Result of alpha blending with graded circular aperture.

The fusion algorithm is essentially to display foveal pixels where they exist, and panoramic pixels otherwise (FIG. 3($b$)). In order to make the fusion less jarring to the observer, the foveal and panoramic data are blended using a set of concentric alpha masks, yielding a high-resolution circular fovea smoothly inset within a low-resolution periphery (FIG. 3($c$)). All coordinate transformations and masking are done by graphics hardware using OpenGL. When not interrupted by saccade commands, the system runs at 15 fps. It will be understood by those skilled in the art that the programs referred to herein such as for example OpenGL and Cyclovision software are non-limiting examples of software that may be used.

Saccades are initiated in two ways. If the observer clicks the mouse in the display, the location is transformed from display to pan/tilt coordinates which form the target of an immediate saccade. Saccades may also be initiated by a motion localization algorithm, which we describe below.

4) Motion Localization

Algorithm

The system may be operated to make saccades to points in the panorama where motion is detected. A fundamental issue in motion processing is how to select the spatial scale of analysis. In our case, the purpose of the detection is to drive the fovea to the point of interest to resolve the change. Thus it is natural to match the scale of analysis to the FOV of the foveal sensor in panoramic coordinates. In this way, saccades will resolve the greatest amount of motion energy.

Figure 4:
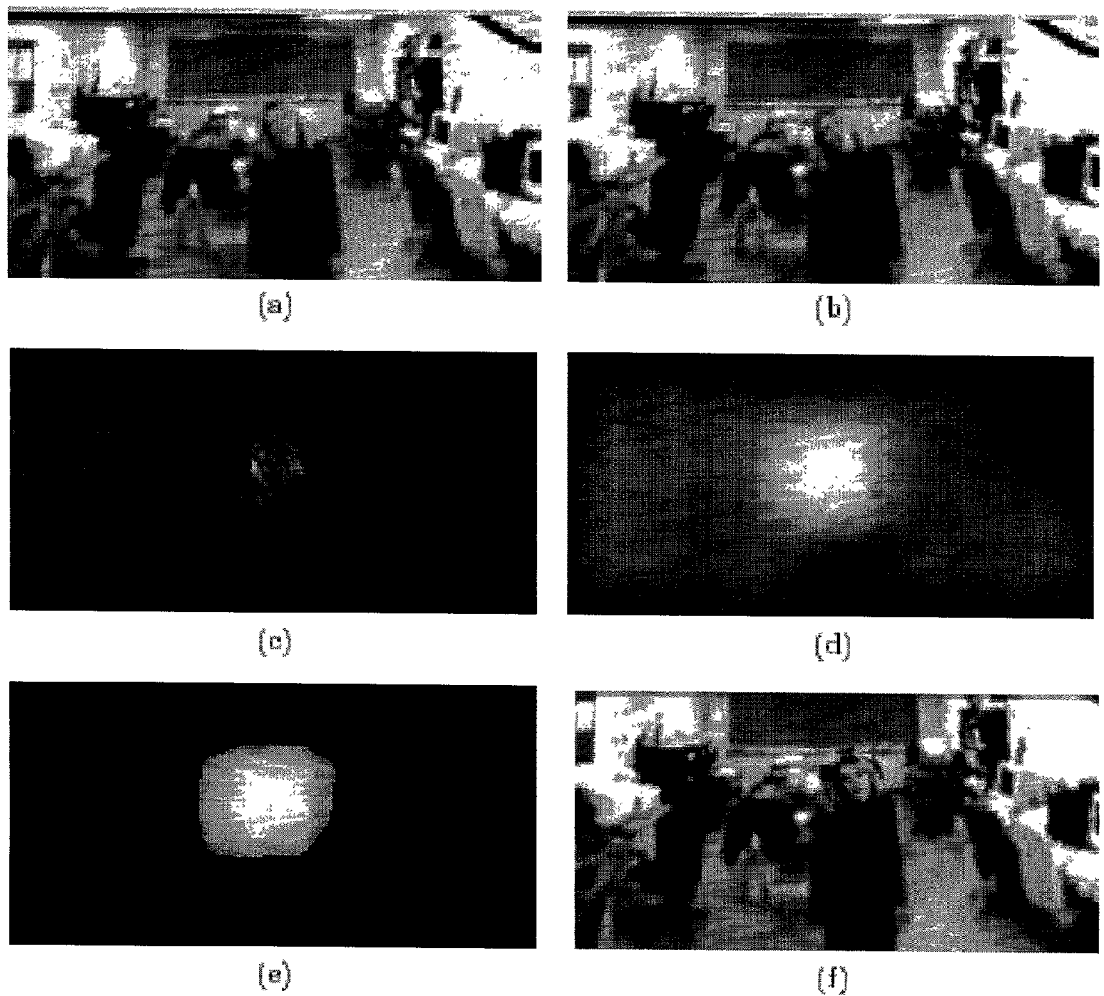
FIGS. 4(a) and (b) show successive panoramic frames used for motion computation.
FIG. 4(c) shows a raw motion map.
FIG. 4(d) shows a motion map after ROI convolution.
FIG. 4(e) shows a motion map after thresholding.
FIG. 4(f) shows resulting fixation.

Successive panoramic RGB image pairs (FIGS. 4($a$–$b$)) are differenced, rectified, and summed to form a primitive motion map (FIG. 4($c$)). This map is convolved with a separable square kernel that approximates the FOV of the foveal sensor in panoramic coordinates (50×50 pixels). The resulting map (FIG. 4($d$)) is thresholded to prevent the generation of saccades due to sensor noise and vibration (FIG. 4($e$)).

Figure 5:
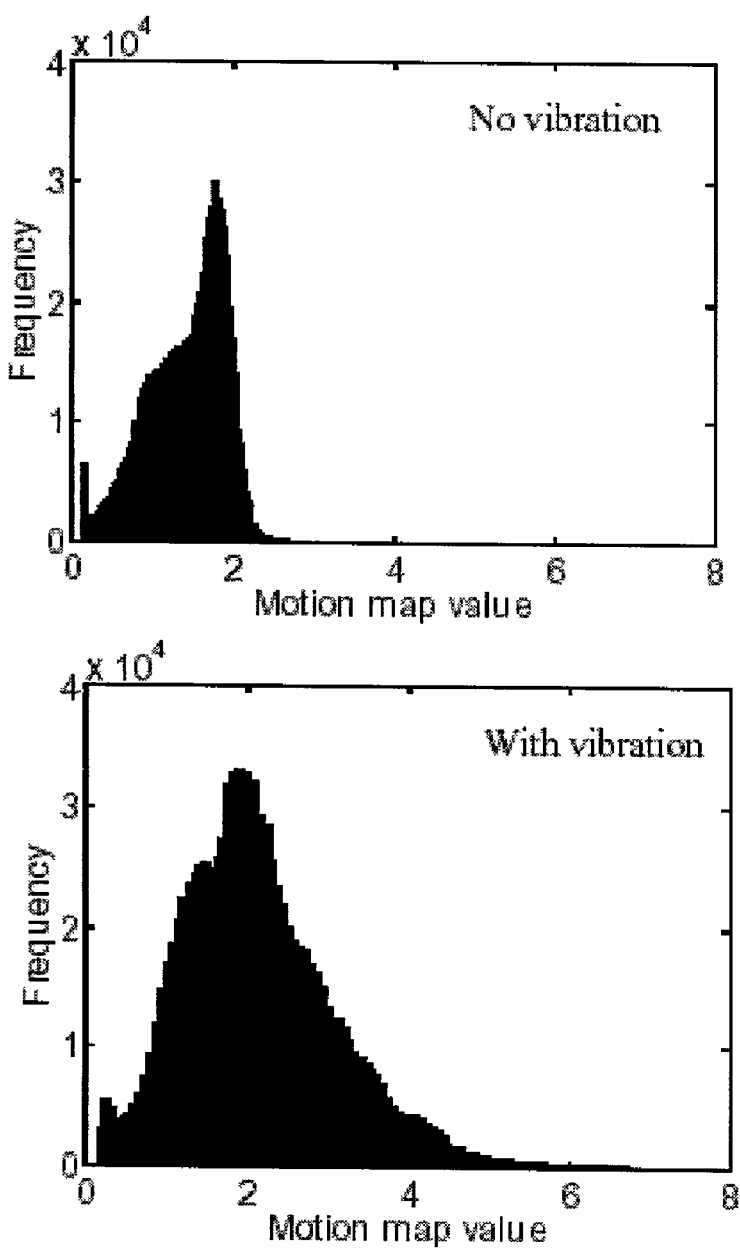
FIG. 5(a) shows a motion map noise distribution (no saccade)
FIG. 5(b) shows a motion map noise distribution (immediately post-saccade)

In order to select the appropriate threshold, an experiment was conducted in which motion map statistics were collected for a static scene. Thirty motion maps yielded nearly a million data points. We ran this experiment under two different conditions. In the first condition, saccades were inhibited, so that vibration in the sensor was minimized. The resulting distribution of motion values is shown in FIG. 5($a$). In the second condition, the motion maps were computed immediately following a saccade, at which time it is expected the vibration to be near its maximum (FIG. 5($b$)). The noise distribution can be seen to depend strongly on the state of the sensor. In the present prototype we use the first distribution to determine the threshold (3.0) and simply inhibit motion detection for a 2-second period following each saccade.

The location of the maximum of the thresholded motion map determines the next fixation (FIG. 4($f$)). Since the motion computation and the video fusion computations are done by the same CPU, motion computation pauses the update of the display for an average of 400 msec. This need not occur in a true telepresence application, in which the attention algorithms could run on the host computer of the sensor and the fusion algorithms could run on the client computer of the observer.

5) Memory

What information the human visual system retains over a sequence of fixations is a subject of debate in vision science at the present time (e.g. Rensink, O'Regan, and Clark (1997)). There is no question, however, that humans have some forms of visual memory (iconic, short-term, long-term).

Figure 6:
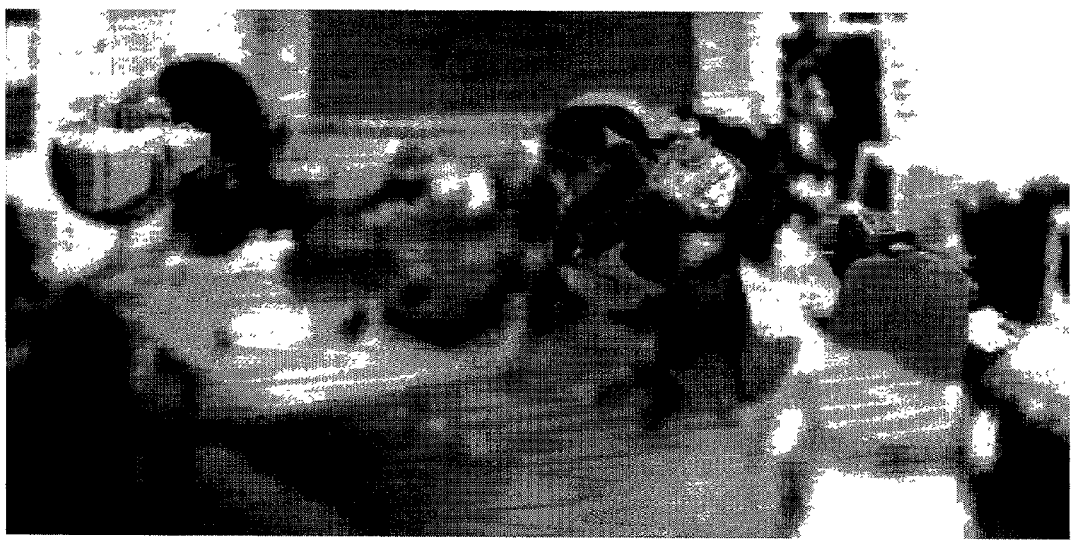
FIG. 6(a) shows the fixation mosaic.
FIG. 6(b) shows fading fixations.
Figure 6:

We have implemented a primitive sort of memory in our own artificial attentive sensor. The display duration of foveal images from past fixations is determined by a memory parameter. At one extreme, previous foveal data are immediately replaced by more recent low resolution data from the peripheral sensor. At the other extreme, a sequence of fixations builds up a persistent high resolution mosaic (FIG. 6($a$)). In intermediate modes, foveal data from previous fixations gradually fade into more recent low-resolution data (FIG. 6($b$)).

6) Foveal/Panoramic Fusion for Close-Range Dynamic Scenes

In Section 2 there was described a manual calibration procedure to estimate homographies relating foveal to panoramic coordinate systems over a lattice of pan/tilt gaze directions, and then to interpolate over this table of homographies to estimate an appropriate homography given arbitrary pan/tilt coordinates. At each pan/tilt direction in the lattice, calibration amounts to the selection of at least four pairs of corresponding scene points in panoramic and foveal images, followed by a least-squares estimation of the matrix parameters. A drawback with this approach is that it works well only for distant or static scenes. For close-range, dynamic scenes, these homographies are functions of time, and so cannot be pre-computed. Thus we require a method for automatically computing a mapping that is both a function of space (direction in the viewing sphere) and time.

Although the problem of automatic image registration has been studied in more conventional applications, the problem of registering panoramic and conventional video has not previously been addressed, and this problem presents unique challenges due to (i) the extreme differences in resolution between the sensors (more than 16:1 linear resolution ratio in our application—see FIG. 2 for an example), (ii) the consequent reduction in the number of panoramic pixels within the foveal field-of-view that may be used for registration (less than 0.5% of the raw panoramic image), and (iii) the resolution inhomogeneity of panoramic images.

First, we will show how a coarse registration between the high-resolution images and the low-resolution panoramic images can be computed using a parametric template matching technique, using a discrete scale space that can accommodate the inhomogeneity of panoramic images. Second, we develop and evaluate two methods, one feature-based and the other featureless, for estimating the 2D projective transform between the high-resolution (foveal) image and the low-resolution panoramic images. The featureless approach operates directly on dense image descriptors computed in both images.

Several factors make the automatic registration of foveal and panoramic video streams challenging (FIGS. 1 and 7):

1. Many papers have been published on the problems of matching and registration ((Brown, 1992)).However, matching and registration are resolution-dependent processes, and these studies generally assume roughly equivalent resolution between sensors. Recent studies that have addressed the problem of resolution differences ((Dufourneau & Horaud, 2000), (Hansen & Morse, 1999)) have considered scale factors up to only a factor of 6. However, in our application, the linear resolution difference between the foveal and panoramic images is as large as 16:1. Moreover, the images registered in previous studies are obtained by the same conventional camera, i.e. the scale differences result solely by optical zooming. Thus the images to be registered are likely to be much more closely related than those obtained by our bipartite foveated panoramic sensor.

Figure 7:
FIG. 7 shows the foveal image (left) and a (roughly) corresponding region in the panoramic image (right) of FIG. 1(d)
Figure 7:
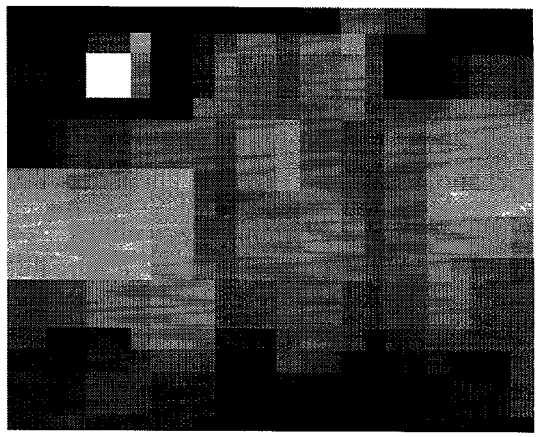

2. Due to the large resolution difference between fovea and panorama, only roughly 0.5% of the panorama (roughly 50×30 pixels) is within the foveal field-of-view. Thus the information available in the panorama for registration is severely limited. FIG. 7 suggests that even the human visual system may find this problem difficult with so little information.

3. Unlike conventional images, the resolution of panoramic images (provided by catadioptric sensors) varies as a function of viewing direction ((Conroy & Moore, 1999)). For a parabolic mirror, the resolution in the warped panorama varies as a function of the elevation, i.e. the vertical coordinate in the panoramic image.

Figure 8:
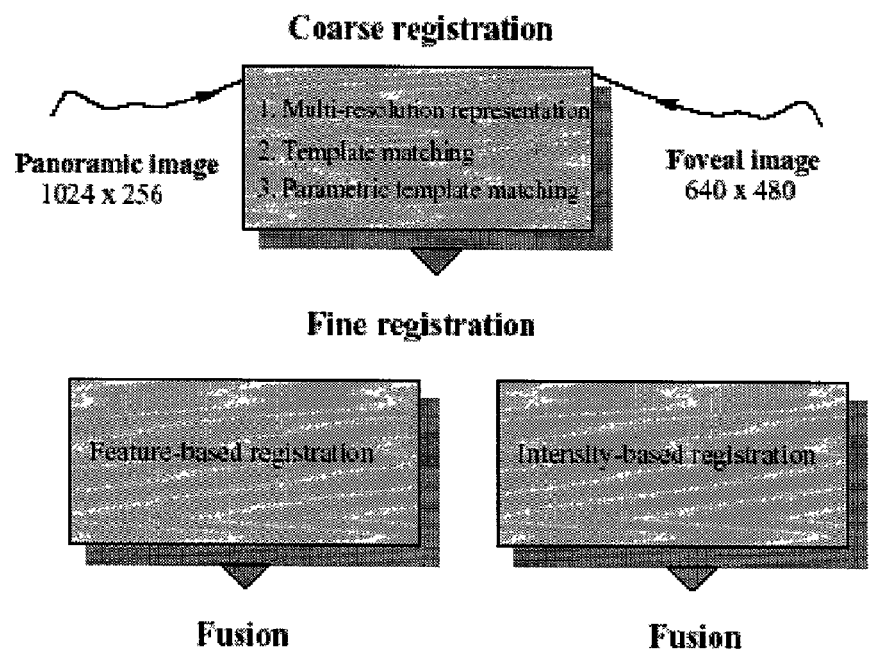
FIG. 8 shows the main stages of the foveal/panoramic image registration in accordance with the present invention.

The present invention solves this challenging registration problem using a coarse-to-fine scheme. The registration process is split into two main stages (FIG. 8). In the first stage, a coarse registration is computed using parametric template matching between the panoramic image and a multi-resolution representation of the foveal image. This provides an estimate of the translation and scale factors between the two images.

In the second stage, this coarse registration is used to bootstrap a refinement process in which a full 2D projective mapping is computed. We study two different refinement methods. The first recovers point matches between either either high-gradient pixels or interest points, and then uses a robust estimation procedure (RANSAC (Fischler & Bolles, 1981)) to estimate the complete 2D projective transformation. The second method directly estimates geometric and photometric transforms between the images by minimizing intensity discrepancies.

The goal of coarse registration is to find the overlap region in the panoramic image that roughly corresponds to the foveal image. The foveal and panoramic cameras are mounted so that the optical axis of the foveal camera and the effective optical axis corresponding to a local patch of the panoramic image are roughly parallel. Thus coarse registration can be achieved by estimating two scale factor[1] and a 2D translation vector. Once this coarse registration is estimated more elaborate methodologies can refine it to a full homography transform as discussed in the sections entitled Feature-based registration and Featureless registration discussed hereinafter.

Figure 9:
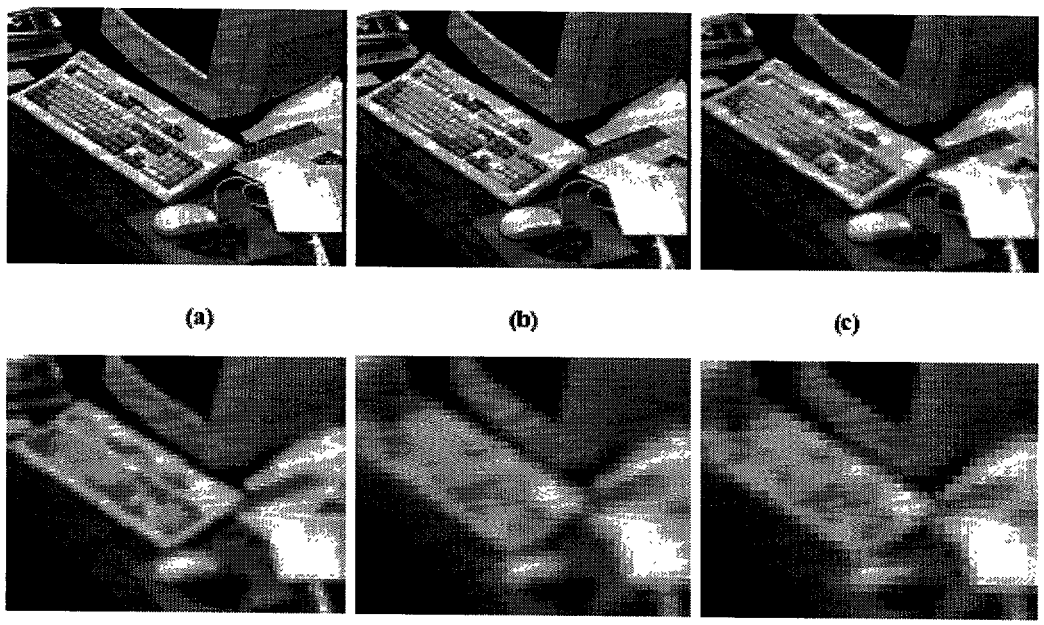
FIG. 9 shows a Gaussian multi-resolution representation of the foveal image; 9(a) Original foveal image (640×480 pixels), 9(b), 9(c), 9(d), 9(e), and 9(f) show the same image at five different resolutions, subsampled by factors of: 2, 4, 8, 12, and 16, respectively.

[1]The aspect ratio is not invariant due to the variation in panoramic resolution with elevation Multi-resolution Representation Due to the difference in their resolutions, it is difficult to match the foveal image with the panoramic image directly. Instead we employ a discrete Gaussian pyramid representation ((Jolion & Rosenfeld, 1994)). The pyramid representation is constructed by iterating these two steps: (i) smoothing with a Gaussian kernel, and (ii) down-sampling by a factor of more than one. The process of smoothing is crucial to prevent aliasing. A 2D 7×7 Gaussian blur kernel is employed (the space constant of the Gaussian is roughly $\sqrt{2}$ pixels). FIG. 9 shows a Gaussian pyramid representation for an example foveal image. While multiresolution pyramid representations for coarse-to-fine registration have been used before (e.g, (Mann & Picard, 1997), (Szeliski, 1994), (Wu, Kanade, Li, & Cohn, 2000)), these involve pyramids built from input images of similar resolution, so that corresponding levels in the pyramids are also matched in resolution. In our work, only one pyramid is built, and the scale factor mapping foveal to panoramic resolution is estimated using parametric techniques.

Parametric Template Matching Over Scale Space

In the system disclosed herein, the scaling factors between foveal and panoramic images are roughly known. The horizontal scale factor is approximately 12:1 for the whole warped panorama, and we use this factor in computing the subsampled foveal representation. The vertical scale factor, however, varies from roughly 12:1 to 16:1 within the upper two thirds of the panorama, and so a single level of the pyramid will not suffice. We neglect the lower third of the panoramic field of view, since in our system it primarily images the desk on which it stands.

The approach to this problem is to bracket the expected vertical scale with two pyramid levels, one at a scale lower than the expected scale, and the other at a scale higher than the expected scale. Translational mappings between foveal and panoramic images are computed for both scales using conventional template matching techniques, and the optimal transform (i.e., the vertical scale and the 2D translation) is estimated parametrically from these. In the following, the inventors first describe the methods for estimating the translational mapping for a fixed level of the foveal pyramid. The parametric technique is then used to estimate the true coarse registration.

Estimating the Translational Mapping

We employ featureless (correlative) techniques to estimate an approximate 2D translation relating foveal and panoramic images. We have tested several specific techniques including ((Stark & Tuteur, 1979)):

1. Minimizing the Sum of Squared Difference (SSD), which is optimal assuming the matching images differ only by white Gaussian noise.
2. Maximizing the correlation, which is near-optimal if the matching images differ only by white Gaussian noise and the energy of panoramic subimages is approximately invariant.
3. Maximizing covariance.
4. Maximizing the Pearson correlation (so-called normalized correlation).

The inventors have found the normalized correlation technique to be more reliable than the others, presumably because the normalization reduces error due to photometric differences between the two sensors. The normalized cross-correlation between the foveal image $I_f$ and the panoramic image $I_p$ at location $p=(u',v',1)^T$ is given by:

$$\rho(P) = \langle I_p, I_f \rangle = \frac{\sum_{(u,v)}(I_{p(u'+u,v'+v)} - \bar{I}_p)(I_f(u,v) - \bar{I}_f)}{N\sigma_p\sigma_f} \quad (1)$$

where N is the number of pixels of $I_f$, $\bar{I}_p$ is the local average over the overlap region of the panoramic image, $\sigma_f$ and $\sigma_p$ are the standard deviations associated with $I_f$ and the panoramic image overlapped by $I_f$. Thus by maximizing $\rho(p)$ over a part of the panoramic image $I_p$, we can estimate the 2D translation $p_r$ between the images:

$$p_r = \operatorname{argmax}_p \rho(p) \quad (2)$$

Since the pan axis of the foveal camera is coincident with the optical axis of the panoramic camera, and since the optical centre of the foveal camera lies approximately on its rotational axes, the pan/tilt coordinates of the fovea provide information that constrains the probable translation between the images. To quantify these constraints, we determined translational correspondences for a number of scene point pairs at different depths and locations over a regular grid of pan/tilt gaze coordinates. Note that given fixed pan/tilt coordinates, the horizontal mapping is nearly invariant. The vertical mapping varies more, but hard constraints on the sensor system and typical room geometry also limits this mapping.

These constraints can be applied by pre-computing means and standard deviations for these distributions over a regular grid of pan/tilt locations. Given pan/tilt coordinates during operation, this table is bilinearly interpolated to estimate the mean and standard deviation of expected translational parameters. We then constrain our panoramic search region to lie within the 95% confidence interval determined by these statistics, assuming a normal model. Typical values for the horizontal and vertical standard deviations are: $\sigma_h=5$ pixels and $\sigma_v=10$ pixels. These prior constraints play a similar role to the epipolar constraints employed in conventional imaging systems.

Parametric Template Matching

Given two computed levels of the foveal pyramid bracketing the true vertical scale factor, we use a parametric template matching method ((Tanaka, Sano, Ohara, & Okudaira, 2000)) to estimate the true vertical scale factor relating the foveal and panoramic images given the best translational mapping associated with each reference scale.

We proceed as follows. Let $I_{f1}$ and $I_{f2}$ be two computed levels of the foveal pyramid at scales $s_1$ and $s_2$ bracketing the true vertical scale factor. Let $t_1$ and $t_2$ be normalized versions of $I_{f1}$ and $I_{f2}$ and let $I_p$ be the panoramic image. We have:

$$\sum_{(u,v)} t_1(u,v) = 0$$

$$\sum_{(u,v)} t_1^2(u,v) = 1$$

$$\sum_{(u,v)} t_2(u,v) = 0$$

$$\sum_{(u,v)} t_2^2(u,v) = 1$$

$t_1$ and $t_2$ are the reference templates. The parametric template associated with $t_1$ and $t_2$ can defined as a linear interpolation of the reference templates ((Tanaka et al., 2000)):

$$t = \frac{w_1 t_1 + w_2 t_2}{\|w_1 t_1 + w_2 t_2\|}$$

where $w_1, w_2 \in [0,1]$, and $w_1+w_2=1$. The denominator is necessary to obtain a normalized image. Given the reference templates $t_1$ and $t_2$ together with the panoramic image $I_p$, we want to determine the weights $w_1$ and $w_2$ that optimize the registration of the associated parametric template $t(w_1+w_2)$ with the panoramic image $I_p$. In other words, we seek the $w_1$ and $w_2$ hat maximize the normalized cross-correlation of $t(w_1, w_2)$ with $I_p$.

By definition the normalized cross-correlation between the parametric template and the panoramic image $I_p$ is given by:

$$\rho(w_1, w_2) = \langle I_p, t(w_1, w_2) \rangle$$

$$= \left\langle I_p, \frac{w_1 t_1 + w_2 t_2}{\|w_1 t_1 + w_2 t_2\|} \right\rangle$$

$$= \frac{w_1 \langle I_p, t_1 \rangle + w_2 \langle I_p, t_2 \rangle}{\|w_1 t_1 + w_2 t_2\|}$$

The parameters, $w_1$ and $w_2$, can be estimated by maximizing the above normalized cross-correlation over all weights $w_1$ and $w_2$ all panoramic locations $p_1, p_2$. Since this four-dimensional optimization problem cannot be solved analytically, we adopt the heuristic of first determining the optimal $p_1$ and $p_2$ that maximize the individual normalized cross-correlations $\rho_1$ and $\rho_2$:

$$\rho_1 = \max_p vect \langle I_p, t_1 \rangle$$

$$\rho_2 = \max_p vect \langle I_p, t_2 \rangle$$

and then optimizing the resulting parametric template over $w_1$ and $w_2$:

$$\rho(w_1, w_2) = \frac{w_1 \rho_1 + w_2 \rho_2}{\|w_1 t_2 + w_2 t_2\|} \quad (3)$$

Since the norm of a matrix A is given by:

$$\|A\| = \sqrt{\operatorname{trace}(A^T A)}$$

it follows that $\|w_1 t_1 + w_2 t_2\|$ can be written as:

$$\begin{aligned}\|w_1 t_1 + w_2 t\| &= \sqrt{\operatorname{trace}((w_1 t_1 + w_2 t_2)^T (w_1 t_1 + w_2 t_2))} \\ &= \sqrt{\operatorname{trace}(w_1^2 t_1^T t_1 + w_2^2 t_2^T t_2 + w_1 w_2 t_1^T t_2 + w_1 w_2 t_2^T t_1)} \\ &= \sqrt{(w_1^2 \operatorname{trace}(t_1^T t_1) + w_2^2 \operatorname{trace}(t_2^T t_2) + w_1 w_2 \operatorname{trace}(t_1^T t_2) + w_1 w_2 \operatorname{trace}(t_2^T t_1))} \\ &= \sqrt{w_1^2 + w_2^2 + 2 w_1 w_2 \operatorname{trace}(t_1^T t_2)} \\ &= \sqrt{w_1^2 + w_2^2 + 2 w_1 w_2 \rho_{12}}\end{aligned}$$

In the above manipulations, we have used the equations: $\operatorname{trace}(t_1^T t_1) = \|t_1\|^2 = 1$, $\operatorname{trace}(t_2^T t_2) = \|t_2\|^2 = 1$ and $\rho_{12} = \operatorname{trace}(t_1^T t_2)$ (the normalized cross-correlation between the two reference templates).

Therefore, Eq. (3) can be written as:

$$\rho(w_1, w_2) = \frac{w_1 \rho_1 + w_2 \rho_2}{\sqrt{(w_1^2 + w_2^2 + 2 w_1 w_2 \rho_{12})}} = \frac{w^T c}{(w^T M w)^{1/2}}$$

where $c = (\rho_1, \rho_2)^T$, $w = (w_1, w_2)^T$ and M is given by:

$$M = \begin{bmatrix} 1 & \rho_{12} \\ \rho_{12} & 1 \end{bmatrix}$$

Thus, the parameters $w_i$ can be recovered by maximizing the above normalized cross-correlation with a constraint:

$$\max_w = \frac{w^T c}{(w^T M w)^{1/2}} \text{ with } \sum_{i=1}^{2} w_i = 1$$

By taking the first derivatives of the above function with respect to w and equating to zero we obtain:

$$M w w^T c = c (w^T M w)$$

The above equation stipulates that the vector Mw is equal to c up to a scale, i.e:

$$Mw \equiv c$$

Since w components must satisfy $$\left( \sum_{i=1}^{2} w_i = 1 \right)$$

the parameters are given by:

$$w = (w_1, w_2)^T = \frac{M^{-1} c}{\sum_{i=1}^{2} (M^{-1} c)} \quad (4)$$

Thus, given the normalized cross-correlation between the two reference templates, as well as the best normalized cross-correlation between each reference template and the panoramic image, and, the best interpolation parameters are given by Eq.(4). Once the interpolation parameters w are estimated, the best vertical scale factor can be approximated by:

$$s = w_1 s_1 + w_2 s_2 \quad (5)$$

Figure 10:
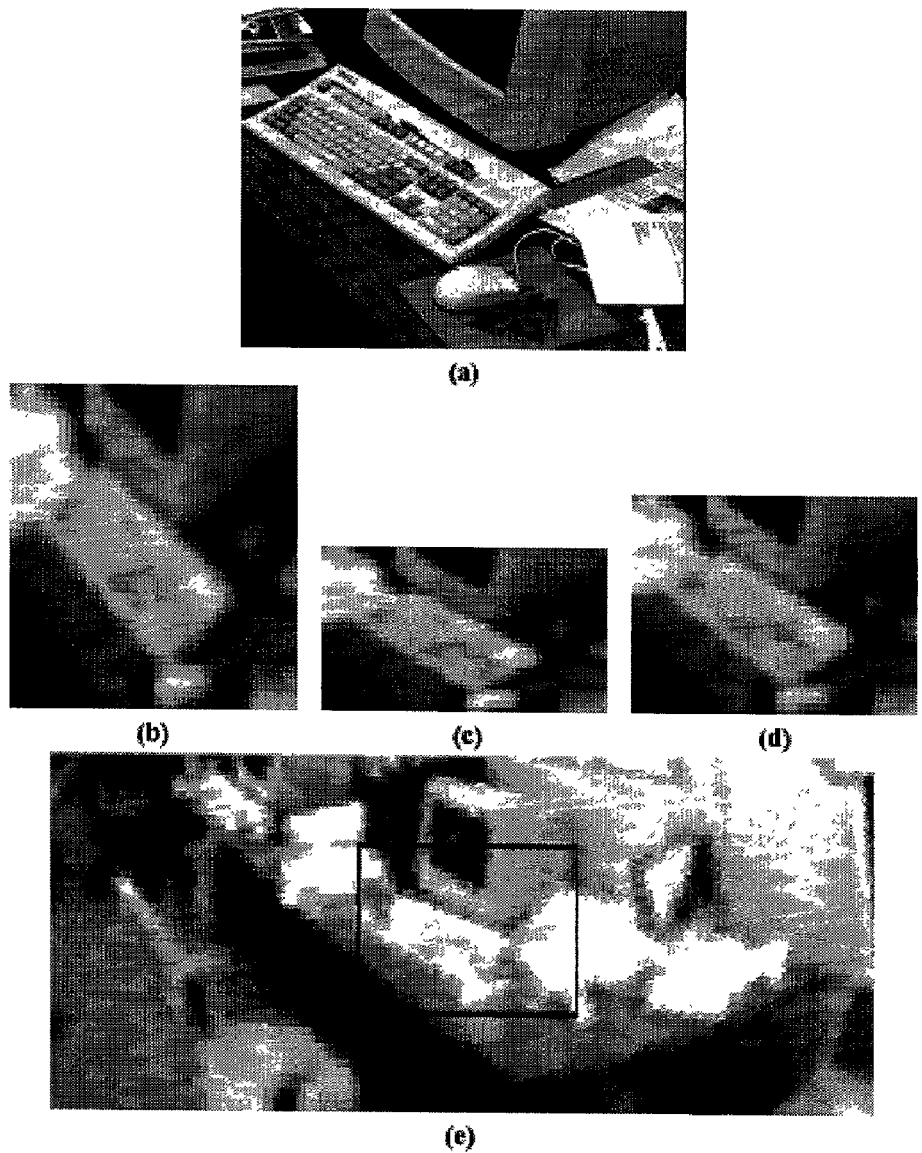
FIG. 10 shows coarse registration using parametric template matching based upon two low-resolution representations f the foveal image, 10(a) shows the original foveal image, 10(b) and 10(c) show the reference templates associated with he two vertical scales ⅛ and ¹⁄₁₆, respectively, 10(d) shows the parametric template associated with the computed ertical scale (0.09≈¹⁄₁₂), 10(e) shows the panoramic image showing coarse registration of foveal parametric template.

FIG. 10 illustrates the application of this approach to coarse registration. Two different low resolution representations at bracketing vertical scales of $s_1 = 1/16$ and $s_2 = 1/8$ been constructed from the foveal image shown in FIG. 9(a). Each of the scaled foveal images was registered using normalized cross-correlation. The estimated 2D pixel location for the two scaled foveal images were (792, 83) for $s_1$ and (792 68) for $s_2$ and the corresponding normalized cross-correlations were 0.75 and 0.61 respectively. By applying Eq.(4) we estimated $(w_1, w_2) = (0.56, 0.44)$ from which the approximated true vertical scale was computed by Eq. (5) ($s = 0.09 \approx 1/12$).

Once the vertical scale is estimated, a scaled, low-resolution foveal image is computed from the original high-resolution foveal image, using the estimated vertical scale factor and a scale factor of $1/12$ in the horizontal direction. We then estimate the translational parameters of the coarse registration using normalized cross-correlation of this rescaled foveal image with the panorama. FIG. 10(e) shows the final coarse registration of the foveal and panoramic images.

The translation and scaling transform computed in our coarse registration stage can be used to initialize an estimation of the full local homography relating foveal and panoramic coordinates. In the following we develop and compare feature-based and featureless methods for estimating this homography. In both cases, we use the foveal parametric template estimated in the coarse registration phase.

Feature-based Registration

Due to its inherent combinatorial complexity and its ill-posedness, the matching problem is one of the bottle-necks in computer vision and low-level image analysis ((Moghaddam, Nastar, & Pentland, 1996)). There are two schools of thought for solving the matching problem. In the first, features are detected in one image and matches are sought in the second image. In the second, features are detected independently in both images and then matched up. We have developed and evaluated two matching strategies, one of each type. The first is based on the use of gradient maps detected in the foveal image $I_f$. The second attempts to match detected interest points in both images $I_f$ and $I_p$. One advantage of the first strategy is that many point-to-point matches can be obtained even though the size of the rescaled foveal image is small, which is very useful when robust statistics such as M-estimators, RANdom SAmple Consensus (RANSAC), and regression diagnostics are used.

Method 1: Matching High-gradient Pixels

Feature Matching

The basic idea here is to match foveal features at locations of large gradient magnitude, estimate using the Sobel operator, with the panoramic image using a small search region for each foveal pixel. The restriction of matching to points of high gradient prevents underconstrained, featureless regions of the foveal image from being matched. The location of the search window is derived from the 2D location associated with the coarse registration (Eq.(2)). The centre of the search window (in the panoramic image frame) is the sum of two 2D vectors: (i) the coarse registration, $p_r$, and (ii) the current location of the pixel (in the foveal image). We use normalized cross-correlation as a similarity measure between each foveal feature and its associated candidates.

For each high-gradient foveal pixel, the best-matching panoramic point is selected from among the candidates, i.e. we select the panoramic feature having the largest normalized cross-correlation over the search window. If this normalized cross-correlation exceeds a certain threshold a match is declared (in our experiments this threshold was set to 0.5).

Figure 11:
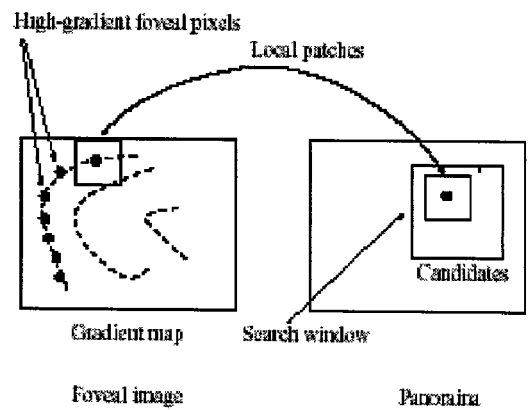
FIG. 11 shows a process of matching based on the use of gradient maps.

FIG. 11 illustrates the basic idea. In our experiments, the size of the search window varied as a function of the vertical scale of the foveal image: from 7×7 pixels for a 16:1 scale to 13×13 pixels for a 12:1 scale. The size of each local patch (averaging window) was 11×11 pixels.

2D Projective Mapping

The local homographic mapping between foveal image coordinates $p=(u, v, 1)^T$ and panoramic image coordinates $p'=(u', v', 1)^T$ given by $p' \cong Hp$ where $\cong$ represents equality up to a scale factor and $H \equiv h_{ij}$ is a 3×3 matrix.

Thus $$u' = \frac{h_{11}u + h_{12}v + h_{13}}{h_{31}u + h_{32}v + h_{33}} \quad v' = \frac{h_{21}u + h_{22}v + h_{23}}{h_{31}u + h_{32}v + h_{33}}$$

The homography H can be recovered up to a scale factor using standard linear algebra tools assuming at least four matches. To avoid numerical instability, the image coordinates of the matches in both images are translated and rescaled so that the homogeneous coordinates are close to $(1,1,1)^T$.

Robust Estimation

Robust estimation techniques provide more reliable estimation in the presence of outliers (mismatched features) ((Meer, Mintz, Rosenfeld, & Kim, 1990)). Here we use the RANSAC algorithm ((Fischler & Bolles, 1981)), which splits the set of putative matches into disjoint outlier and inlier subsets. The estimated homography is that having the largest support among putative matches. In our approach we further enhance reliability by computing estimates over several gradient thresholds, and then selecting the most consistent. The entire algorithm proceeds as follows. First, the foveal gradient magnitude map is computed. Using a set of thresholds (10% 20% 30% of the maximum gradient), a set of thresholded gradient magnitude maps is computed. Next, using the gradient map corresponding to the lowest threshold, matches are computed using the process described above. Then, for each gradient threshold a homography is computed using RANSAC, with only the matched foveal pixels whose gradient exceeds the threshold. Note that the matching process is performed once, at the lowest threshold, and only the linear computation of the homography is performed for each gradient threshold.

From the resulting set of homographies, the selected mapping is that which minimizes the SSD between the warped foveal image and the corresponding panoramic subimage. Table 1 illustrates the application of this heuristic to the foveal image shown in FIG. 10(d) using four different gradient maps. In this example, a gradient threshold of 20% produces the optimal homography.

TABLE 1

The Sum of Squared Differences evaluated with four computed homographies. Each one is computed with a gradient map using the RANSAC technique.

| Threshold | High gradient pixels | Matches | Inliers | SSD |
| --- | --- | --- | --- | --- |
| 10% | 823 | 264 | 241 | $11.64 \cdot 10^6$ |
| 20% | 546 | 173 | 169 | $11.55 \cdot 10^6$ |
| 30% | 392 | 124 | 109 | $12.15 \cdot 10^6$ |
| 40% | 282 | 98 | 91 | $12.08 \cdot 10^6$ |

Method 2: Matching Interest Points

Feature extraction

We define an interest point as a locations in the image where intensity changes twodimensionally. Many different interest point detectors exist in the literature. We have chosen the Harris detector due to its reliability in terms of repeatability and information content ((Harris & Stephens, 1988), (Schmid & Mohr, 1998), (Schmid, Mohr, & Bauckhage, 1998), (Zhang, Deriche, Faugeras, & Luong, 1995)). Harris ((Harris & Stephens, 1988))computes a matrix which is related to the auto-correlation function of the 2D signal. The squared first derivatives are averaged over a window. The eigenvalues of the resulting matrix are the principle curvatures of the auto-correlation function. If these two curvatures are high, an interest point is declared.

In order to compute reliable features that are adequately dispersed, we split the foveal image into a 10×10 square grid. For each square the best interest point is retained. Second, the retained features are ordered according to their quality, and only the top 50% are retained. Finally, the relative distances are tested in order to discard very close neighbours. In other words, if two features are very close, we only retain the one of highest quality. A similar strategy is used to detect interest points in the corresponding region of the panoramic image determined in the coarse registration stage.

Matching

Once the extraction step is completed in the foveal image and in the corresponding part of the panoramic image, we are left with two sets of features: (i) the foveal features, and (ii) the panoramic features. The task is to put them into correspondence. Due to its inherent combinatorial complexity, this is a hard task, especially when the number of features is very large. We have used Pilu's method which embodies the principles of similarity, proximity, and exclusion ((Pilu, 1997)). Pilu constructs a pairing matrix whose entries encodes the similarity measure and the proximity measure between two arbitrary features. Then potential matches are detected using an enhanced version of the pairing matrix. We also apply the RANSAC technique to the set of matches found by Pilu's method.

Featureless Registration

In this section we describe how the mapping parameters can be directly estimated from the images without any feature extraction. Although good results can be obtained from feature-based methods, they have several disadvantages:

1. There are many free parameters. There are three windows (search window, correlation window, smoothing window) whose sizes must be selected. The RANSAC algorithm requires three parameters: the number of matches used in each random trial, the total number of random trials and a tolerance parameter for judging the consensus on the obtained solution. There is no general theory to guide the selection of these parameters.
2. Point-to-point matching requires an explicit transformation of the foveal image into a low-resolution representation at the scale of the panorama.
3. Even if all computed matches are correct, instability associated with the computation of the homography may lead to severe geometrical distortion affecting the final fusion. This is studied by Kanatani and Ohta ((Kanatani & Ohta, 1999)).
4. Since measuring feature similarity is based on the use of correlation windows, the border region of the rescaled foveal image is not taken into account. For example, if the rescaled foveal image is 30×53 pixels (a typical size in our application) and the correlation window is 11×11 pixels, the border region ignored by the correlation accounts for roughly 46% of the foveal image.

In this section, we study a featureless registration approach that is not subject to these limitations. Our approach involves the direct estimation of mapping parameters by minimization of the discrepancy between the intensity of the two images. Construction of a low resolution foveal representation is not necessary since the scale can be embedded in the unknown transformation.

Featureless techniques have been applied to the construction of image mosaics in a coarse-to-fine scheme where the 2D transform is iteratively estimated from the coarsest level to the finest level of two pyramids ((Mann & Picard, 1997)). In this case, the full resolution images as well as the images associated with the two pyramid levels (the low resolution ones) have similar resolution. However, the application of this approach to images of grossly different resolutions has, to our knowledge, not been studied.

We denote by $I_f(p)$ the intensity of the foveal pixel $p=(u, v, 1)^T$ and by $I_p(p')$ intensity of its match $p'=(u', v', 1)^T$ in the panoramic image. Note that the image $I_f$ may be of any resolution including the original (full) resolution.

Foveal and panoramic pixels are assumed to be related by a homography $p' \cong Hp$ where $H \equiv h_{ij}$ is a 3×3 matrix such that:

$$u' = \frac{h_{11}u + h_{12}v + h_{13}}{h_{31}u + h_{32}v + h_{33}} \quad (6)$$

$$v' = \frac{h_{21}u + h_{22}v + h_{23}}{h_{31}u + h_{32}v + h_{33}} \quad (7)$$

Without loss of generality, we set $h_{33}$ to 1 since the homography H is defined up to a scale factor. Since these two pixels project from the same scene point, we will assume that their intensities can be related by an affine mapping ((Cox, Roy, & Hingorani, 1995), (Hager & Belhumeur, 1998)):

$$I_p(Hp) = \alpha I_f(p) + \beta$$

where $\alpha$ is the contrast gain and $\beta$ is the brightness shift. These parameters cannot necessarily be precomputed, since the sensors may have dynamic gain control. We thus seek the photometric and geometric parameters of the transformation that minimize $$f(H, \alpha, \beta) = \sum_p v(p)^2 = \sum_p (I_p(Hp) - \alpha I_f(p) - \beta)^2 \quad (8)$$

There are ten unknowns (two photometric parameters, $\alpha$ and, and the eight entries of the homography matrix), and non-linear constraints. We use the Levenberg-Marquardt technique ((Fletcher, 1990), (Press, Teukolsky, Wetterling, & Flannery, 1992)) to solve the problem. For each foveal pixel, the first derivatives of its contribution to the error function (8) with respect to the ten unknowns have the following form:

$$\frac{\partial v}{\partial h_{ij}} = \left( \frac{\partial I_p}{\partial u'} \frac{\partial u'}{\partial h_{ij}} + \frac{\partial I_p}{\partial v'} \frac{\partial v'}{\partial h_{ij}} \right)$$

$$\frac{\partial v}{\partial \alpha} = -I_f(u, v)$$

$$\frac{\partial v}{\partial \beta} = -1$$

where $$\left( \frac{\partial I_p}{\partial u'}, \frac{\partial I_p}{\partial v'} \right)^T$$

the spatial gradient vector associated with the panoramic image, and the derivatives, $$\frac{\partial u'}{\partial h_{ij}} \text{ and } \frac{\partial v'}{\partial h_{ij}}$$

are easily derived from Eqs.(6) and (7). The Levenberg-Marquardt technique uses these derivatives to iteratively update the transform parameters to minimize the error function.

Due to the complexity of our objective function, it is difficult to obtain a good solution without a good initialization. To increase the reliability of the approach, we estimate the transform in two stages of increasing complexity: first affine (6 parameters) and then projective (8 parameters). For the affine stage, we use as an initial guess the translation and scaling parameters estimated by coarse registration. For the projective stage, we use the results of the affine stage as an initial guess. All other parameters are initially set to either zero (non-diagonal elements) or to a scale factor (diagonal elements).

EXAMPLE RESULTS

Feature-based Registration

Figure 12:
FIG. 12 shows feature-based registration using gradient maps.

The feature-based registration methods described in the section entitled Feature-based registration were evaluated over a large number of foveal/panoramic image pairs for which the linear resolution difference varied from 12:1 to 16:1. In all cases, the coarse registration technique described in Section 8.3 was used to define the panoramic search window. FIG. 12 shows results of the gradient-based technique (first strategy). Registrations are based upon between 40–250 matching points (inliers)

Figure 13:
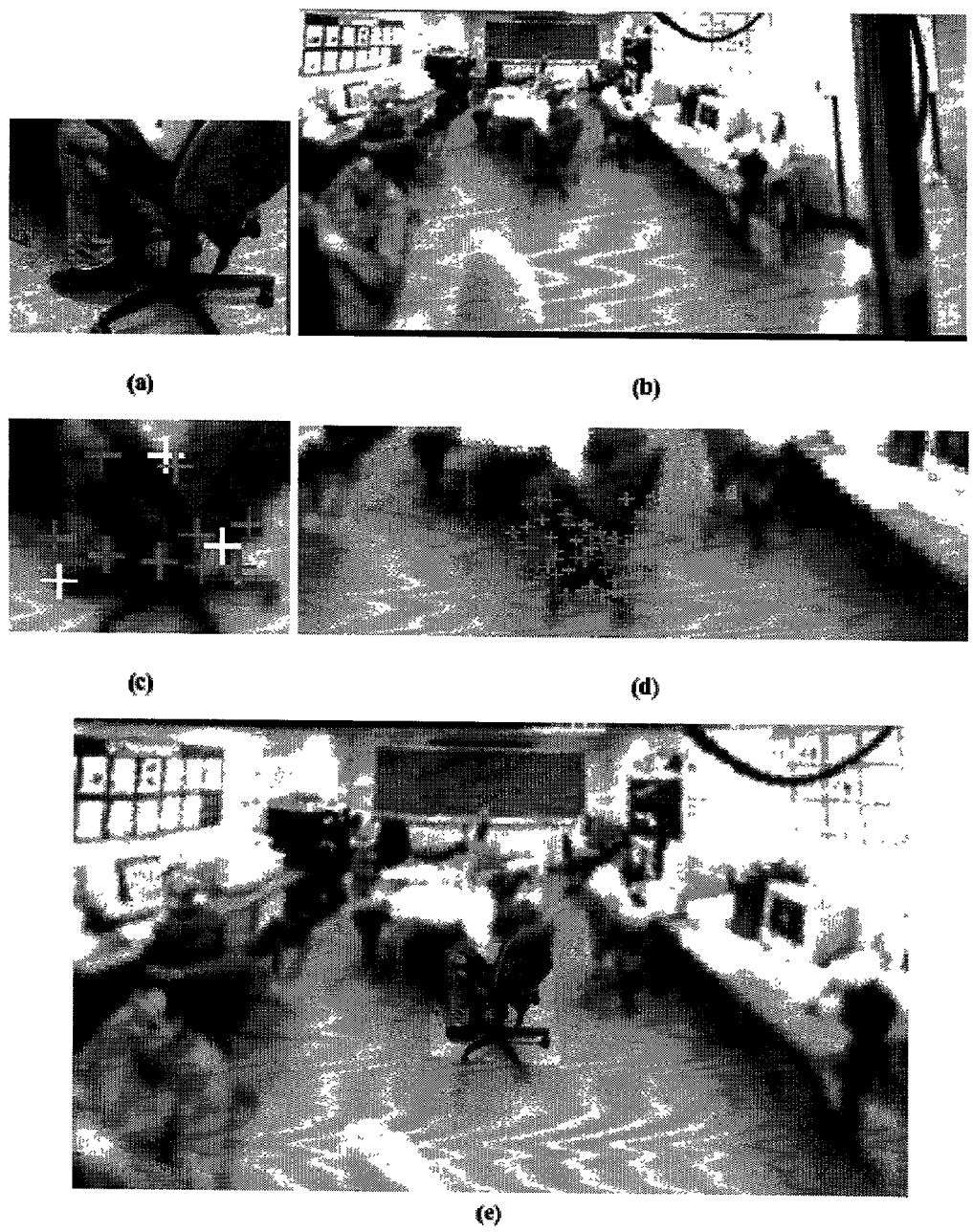
FIG. 13 shows feature-based registration by matching interest points. (a) Original foveal image. (b) Original panorama (right half). (c) 12 interest points are detected in the foveal image (resolution 12:1). (d) 60 interest points are detected in the panoramic image. (e) fused foveal and panoramic images based on the nine computed matches using Pilu's technique (the matches are shown with red crosses in both images)

FIG. 13 shows the results of the second strategy, i.e. the use of Harris interest points together with Pilu's method on the image shown in FIG. 12(d). FIG. 13(a) displays the rescaled fovea (the scale is 12:1 in both direction). FIG. 13(b) displays a part of the panorama. FIG. 8(c) shows 12 detected foveal interest points. FIG. 8(d) shows 60 detected panoramic interest points. FIG. 13(e) shows the fusion result based on the nine computed matches obtained by Pilu's method (the matches are shown in (c) and (d) with red crosses). Qualitatively, there appears to be little difference in performance between the two matching techniques (see FIGS. 12(d) and 13(e). Moreover, the associated CPU time is roughly the same assuming that a reasonable number of interest points is used.

The preliminary implementation of the feature-based registration techniques takes 0.11 sec on average on an SGI Onyx2 machine (20 ms for the multi-resolution representations, 20 ms for the coarse registration assuming that we have a 60×60 initial search region based upon a pre-calibration, 70 ms for the point-to-point matching).

Featureless Registration

Figure 14:
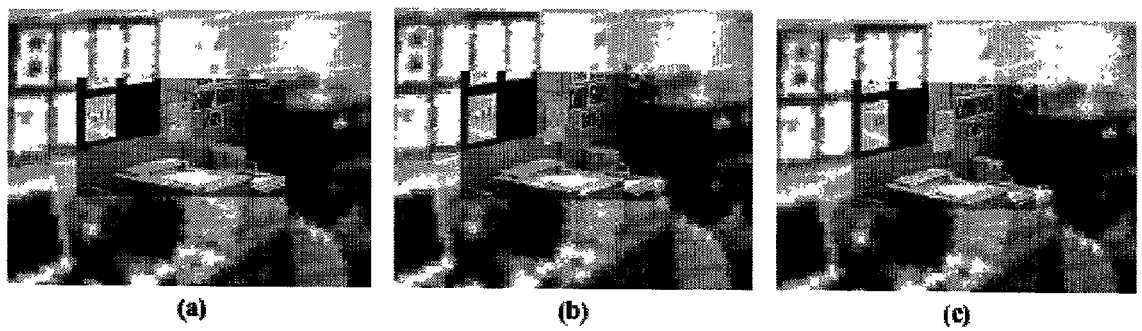
FIG. 14: Progressive featureless registration: (a) The coarse registration stage (2 scales and a 2D translation), (b) affine transform, and (c) 2D projective transform. Each stage of the computation substantially improves the registration (see the top-left of the fovea)
Figure 15:
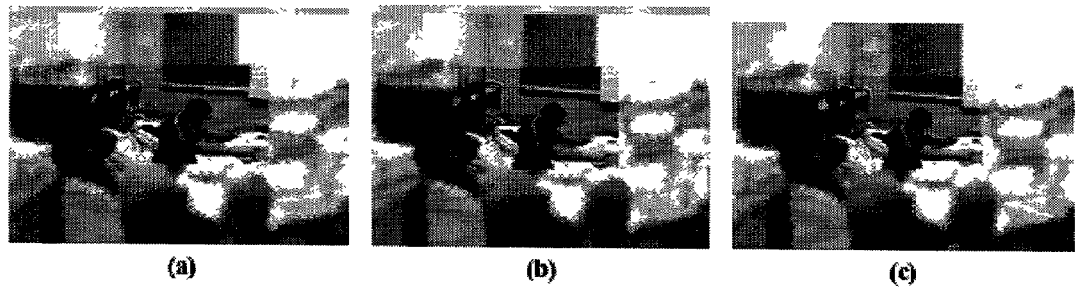
FIG. 15: Progressive featureless registration: (a) The coarse registration stage (2 scales and a 2D translation), (b) affine transform, and (c) 2D projective transform. Each stage of the computation substantially improves the registration (see the top-right of the fovea)

The featureless registration method described in the section entitled Featureless registration was also evaluated over a large number of foveal/panoramic image pairs. FIGS. 14 and 15 shows registration results at three stages of the computation: ((a) coarse registration, (b) affine, (c) projective). Each stage of computation substantially improves the registration.

Figure 16:
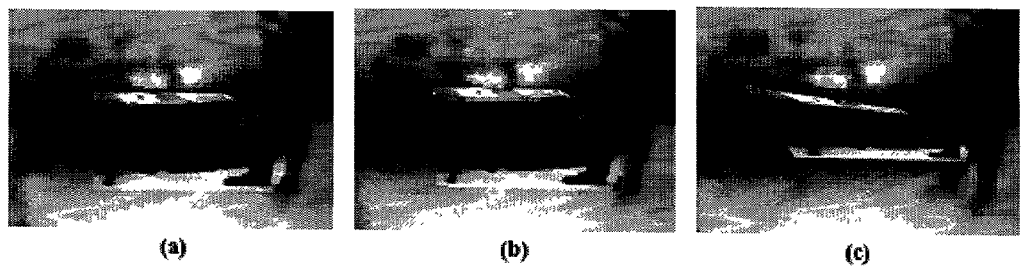
FIG. 16: Progressive featureless registration for a low-contrast foveal image: (a) The coarse registration stage (2 scales and a 2D translation), (b) affine transform, and (c) 2D projective.
Figure 17:
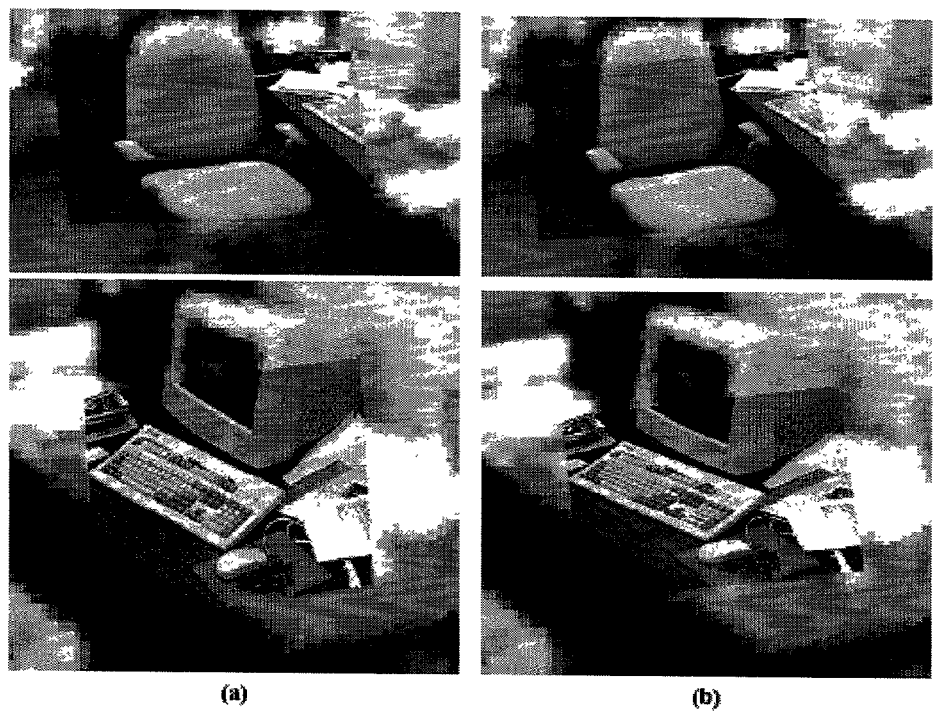
FIG. 17: Featureless registration results. (a) Optimization with a purely geometric transform. The normalized cross-correlations of the transforms are 0.79 (top) and 0.90 (bottom). Note the misregistration of the chair and the keyboard in (top), and the computer screen and the mouse pad (bottom). (b) Optimization with a combined geometric and photometric transform, the normalized cross-correlations of the transforms are 0.88 (top) and 0.94 (bottom)

In these studies, the 2D projective transform typically provides the best registration. However, we find that for low-contrast foveal images the affine transformation may prove superior. FIG. 16 shows such a case. To address such cases, we have developed a post-hoc evaluation technique in which the normalized cross-correlation of both affine and projective transformations of the fovea with the panorama are computed, and the transformation with the largest cross-correlation is selected. In FIG. 16, this criterion selects the affine transformation (cross-correlation of 0.77) over the projective (0.57). FIG. 17 demonstrates the benefit of integrating a photometric transform (the parameters $\alpha$ and $\beta$) within the optimization process.

Objective confirmation of this observation may be obtained by computing the normalized cross-correlations of the two transformations. In both cases, the normalized cross-correlation is greater for the transformation employing both geometric and photometric parameters (0.88 and 0.94) than for the purely geometric transformation (0.79 and 0.90). The average CPU time required for featureless registration was 0.25 seconds including two consecutive non-linear minimizations (affine and projective).

Feature-based Registration Vs. Featureless Registration

Figure 18:
FIG. 18: Registration results using three different methods. (a) Bilinear interpolation of four precomputed homographies. (b) Feature-matching and robust estimation using RANSAC. (c) Featureless method.
Figure 19:
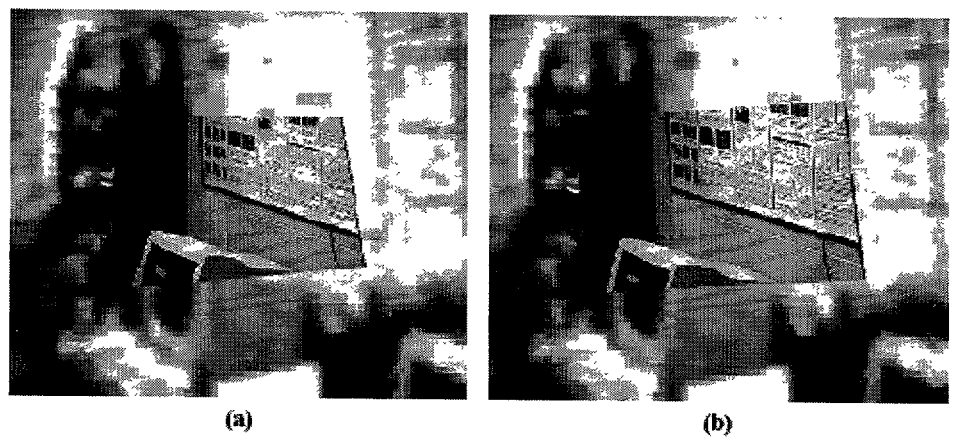
FIG. 19: A comparison between the two registration methods: (a) Feature-based registration. (b) Featureless registration.
Figure 20:
FIG. 20: A comparison between the two registration methods: (a) Feature-based registration. (b) Featureless registration.

FIG. 18 shows registration results for three different registration methods: (a) bilinear interpolation of four pre-computed homographies; (b) our feature-matching method and (c) our featureless method. While both dynamic registration methods improve upon the static calibration, it is clear that the featureless method provides a superior match. The two examples shown in FIGS. 19 and 20 confirm this finding. While subjective evaluation of the fusion results is important, particularly for telepresence applications, objective evaluations are also important, particularly for automatic surveillance applications. Moreover, visual inspection of the fused images relies primarily upon an evaluation of the continuity of features across the foveal boundary: a direct comparison of foveal pixels with corresponding panoramic pixels is not possible, since the foveal pixels mask the panoramic pixels.

To objectively and quantitatively assess the accuracy of the two registration methods, we used the following approach:

1. A nominal homography was invented and used to warp a foveal image to produce a simulation of the corresponding panoramic image.
2. Centred Gaussian noise was added to both foveal and panoramic images, and the 2D mapping (homography) was estimated from the noisy images using the two registration methods: (i) the featurebased registration method, and (ii) the featureless registration method.
3. At each noise level, we repeated each estimation for 100 trials, and report the mean pixel transfer error, defined as the Euclidean distance between the transferred foveal pixels (using the estimated homography) and their ground truth locations averaged over all the foveal pixels (640× 460 pixels) and over all trials.

Figure 21:
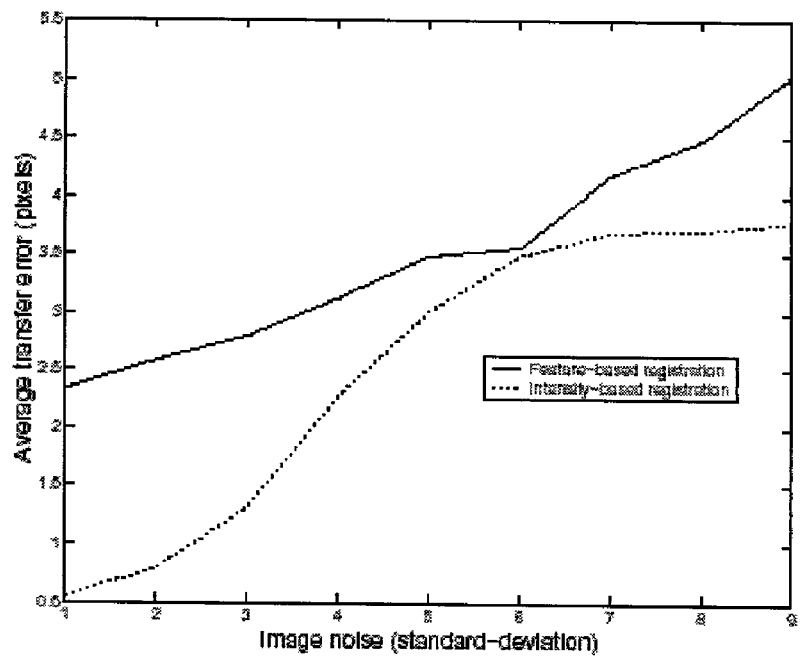
FIG. 21: Average transfer error as a function of image noise.

FIG. 21 displays the average transfer error associated with the estimation of the homography as a function of the added Gaussian image noise. The solid curve corresponds to the feature-based registration method, the dotted curve to the featureless registration method. The featureless method was found to outperform the feature-based method at all levels of noise.

The present invention shows that consistent and efficient registration between high-resolution foveal images and low resolution panoramas provided by a panoramic video sensor can be achieved. Although image registration has been studied in more conventional applications, the challenging problem of registering panoramic and conventional video has not previously been addressed. The challenges associated with the extreme resolution differences, the small field-of-view of the foveal image, and the resolution heterogeneity of the panoramic panorama were overcome using a coarse-to-fine scheme. Thus, our registration process is split into two main stages. In the first stage, a coarse registration is computed using parametric template matching techniques together with a multi-resolution representation of the foveal image. Using parametric template matching allows one to cope with the vertical resolution heterogeneity of the panorama. The coarse registration gives a 2D transform encompassing a rough estimation of the 2D translational mapping and the scale factors existing between the foveal image and the panoramic image.

In the second stage, the coarse registration is refined to a full 2D projective mapping. To this end two different methods have been developed and quantitatively evaluated. The first method attempts to recover pairs of matches using either high-gradient pixels or interest points, and the 2D projective mapping is then computed using the RANSAC technique. The second method directly estimates the 2D projective transform and the photometric transform by minimizing intensity discrepancies. This featureless registration is carried out with progressive complexity using 2D affine and 2D projective parameters. It makes direct and complete use of all available intensity information, eliminating the need to identify a set of features to match, and coping with the physical differences affecting the two sensors (geometry, resolution/scale, radiometry).

It has been disclosed herein that the geometric transform is accurately recovered by the featureless method when both the geometric and photometric transforms are simultaneously estimated. Key elements of our featureless approach are (i) increased robustness by progressively increasing the complexity of the estimated 2D transformation from translation/scaling to affine and projective transformations, (ii) use of the Pearson (normalized) correlation for estimation of the translational mapping, and an affine photometric transform in estimating affine and projective transforms to achieve robustness to photometric differences between sensors, and (iii) parametric template matching for rescaling the foveal image to match the heterogeneous panoramic scales. A comparison between the feature-based method and the featureless method using both real and synthetic foveal/panoramic image pairs shows that the featureless registration is superior in accuracy.

While multi-resolution pyramid representations for coarse-to-fine registration have been used before, previous work involves pyramids built from input images of similar resolution, so that corresponding levels in the pyramids are also matched in resolution. In our work, only one pyramid is built, and the scale factor mapping foveal to panoramic resolution is estimated using parametric techniques.

In coarse registration we exploit the physical constraints on our sensing apparatus to restrict our attention to scaling and translation parameters. This approach can be generalized to a foveal camera that may rotate about its optical axis by adding a rotational parameter in the coarse registration phase, and recovering the parameters using a circular projection method ((Choi & Kim, 2002)).

These results may be useful for applications in visual surveillance and telepresence demanding both large field-of-view and high resolution at selected points of interest. Moreover, the developed registration methods are of general applicability in many fields like remote sensing and video compression. Future work may investigate the enhancement of the featureless registration method by combining an exhaustive and guided search with the gradient descent method.

The present invention discloses for the first time a panoramic visual sensor in which high resolution (foveal) colour video is fused in real time (17 fps as an example) with colour panoramic video. Saccadic behaviour is determined both by the interest of the observer and by autonomous attention (motion) computations. A primitive form of memory permits the accumulation of high resolution information over space, at the expense of temporal resolution.

This invention is useful in both autonomous and semi-autonomous applications. In surveillance operations, security personnel or automatic visual surveillance algorithms can monitor an entire area at low resolution, and 'zoom-in' on activities of interest without losing their global perspective of the scene or their ability to detect other important events. For example, the low-resolution imagery may be sufficient for human surveillance personnel or automatic algorithms to detect individual people. The high-resolution sensor then may provide the resolution required to recognize the individuals.

In teleconferencing applications, the panoramic data may provide participants with a sense or presence and situational awareness, while the high-resolution data may provide the resolution required to recognize individuals and their facial expressions, read text and the like. Automatic algorithms may use the low-resolution data to localize the participants, and to detect the main speaker to which the high-resolution sensor is directed.

In telelearning applications, the remote instructor may use the panoramic imagery to provide a sense of the entire classroom to which s/he is teaching, while manual or automatic methods may be used to localize and direct the high-resolution sensor to students who ask questions or make comments.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

Brown, L. G. (1992). A survey of image registration techniques. *ACM Computing Surveys,* 24(4), 325–376.

Choi, M. S., & Kim, W. Y. (2002). A novel two stage template matching method for rotation and illumination invariance. *Pattern Recognition*(35), 119–129.

Conroy, T. L., & Moore, J. B. (1999). *Resolution invariant surfaces for panoramic vision systems.* Paper presented at the IEEE Conference on Computer Vision.

Cox, J., Roy, S., & Hingorani, S. L. (1995). *Dynamic histogram warping of images pairs for constant image brightness.* Paper presented at the IEEE International Conference on Image Processing.

Danilidis, K., & Geyer, C. (2000). *Omnidirectional vision: Theory and algorithms.* Paper presented at the IEEE International Conference on Patter Recognition.

Dufourneau, Y., & Horaud, C. S. R. (2000). *Matching images with different resolutions.* Paper presented at the IEEE Conference on Computer Vision and Pattern Recognition.

Ferrari, F., Nielsen, J., Questa, P., & Sandini, G. (1995). Space variant imaging. *Sensor Review,* 15(2), 17–20.

Fischler, M. A., & Bolles, R. C. (1981). Random sample consensus: A paradigm for model fitting with applications to image analysis and automated cartography. *Communication ACM*, 24(6), 381–395.

Fletcher, R. (1990). *Practical Methods of Optimization.* New York: Wiley.

Hager, G. D., & Belhumeur, P. N. (1998). Effecient region tracking with parametric models of geometry and illumination. *IEEE Trans. on Pattern Analysis and Machine Intelligence*, 20(10), 1025–1039.

Hansen, B. B., & Morse, B. S. (1999). *Multiscale image registrartion using scale trace correlation.* Paper presented at the IEEE Conference on Computer Vision and Pattern Recognition.

Haritaoglu, I., Harwood, D., & Davis, L. (1998). Who, when, where, what: A real time system for detecting and tracking people. *Proceedings of the Third Face and Gesture Recognition Conference.*

Harris, C., & Stephens, M. (1988). *A combined corner and edge detector.* Paper presented at the Alvey Vision Conference.

Hicks, R. A., & Bajcsy, R. (2000). *Catadioptric sensors that approximate wide-angle perspective projections.* Paper presented at the IEEE Conference on Computer Vision and Pattern Recognition.

Irani, M., Anandan, P., & Hsu, S. (1995). *Mosaic based representations of video sequences and their applications.* Paper presented at the IEEE International Conference on Computer Vision.

Irwin, D. E., & Gordon, R. D. (1998). Eye movements, attention and trans-saccadic memory. Visual Cognition. *Visual Cognition.* 5(1/2), 127–155.

Ishiguro, H., Yamamoto, M., & Tsuji, S. (1992). Omnidirectional stereo. *IEEE Transactions on Pattern Analysis and Machine Intelligence*, 14(2), 257–262.

Jolion, J., & Rosenfeld, A. (1994). *A Pyramid Framework For Early Vision.:* Kluwer Academic Publishers.

Kanade, T., Collins, R., Lipton, A., Burt, P., & L. Wixson. (1998). Advances in cooperative multi-sensor video surveillance. *Proceedings of DARPA Image Understanding Workshop.*

Kanatani, K., & Ohta, N. (1999). *Accuracy bounds and optimal computation of homography for image mosaicing applications.* Paper presented at the IEEE Conference on Computer Vision.

Kumar, R., Anandan, P., Irani, M., Bergen, J., & Hanna, K. (1995). Representations of scenes from collections of images. *ICCV Workshop on the Representation of Visual Scenes.*

Mann, S., & Picard, R. W. (1997). Video orbits of the projective group: A simple approach to featureless estimation of parameters. *IEEE Transactions on Image Processing*, 6(9), 1281–1295.

Meer, P., Mintz, D., Rosenfeld, A., & Kim, D. W. (1990). Robust regression methods for computer vision: a review. *International Journal of Computer Vision*, 6(1), 59–70.

Moghaddam, B., Nastar, C., & Pentland, A. (1996). *A bayesian similarity metric for direct image matching.* Paper presented at the International Conference on Pattern Recognition.

Moller, R., Lambrinos, D., Pfeifer, R., & Wehner, R. (1998). *Wehner. Insect strategies of visual homing in mobile robots.* Paper presented at the Computer Vision and Mobile Robotics Workshop.

Nayar, S. (1997). *Catadioptric omnidirectional camera.* Paper presented at the IEEE Conference on Computer Vision and Pattern Recognition.

Pardo, F., Dierickx, B., & Scheffer, D. (1997). CMOS foveated image sensor: Signal scaling and small geometry effects. *IEEE Transactions on Electron Devices*, 44(10), 1731–1737.

Pilu, M. (1997). *A direct method for stereo correspondence based on singular value decomposition.* Paper presented at the IEEE Conference on Computer Vision and Pattern Recognition.

Press, W. H., Teukolsky, S. A., Wetterling, W. T., & Flannery, B. P. (1992). *Numerical Recipes The Art of Scientific Computing.* New York: Cambridge University Press.

Schmid, C., Mohr, M., & Bauckhage, C. (1998). *Comparing and evaluating interest points.* Paper presented at the IEEE International Conference on Computer Vision.

Schmid, C., & Mohr, R. (1998). Local greyvalue invariants for image retrieval. *IEEE Transactions on Pattern Analysis and Machine Intelligence*, 19(5), 530–534.

Stark, H., & Tuteur, F. B. (1979). Modern Electrical Communications. *Theory and Systems.*

Svoboda, T., Pajdla, T., & Hlavac, V. (1998). *Epipolar geometry for panoramic cameras.* Paper presented at the European Conference on Computer Vision.

Szeliski, R. (1994). *Image mosaicking for tele-reality applications.* Paper presented at the IEEE Workshop on Applications of Computer Vision.

Szeliski, R., & Shum, H. Y. (1997). Creating full view panoramic image mosaics and texture-mapped models. *SIGGRAPH'97.*

Tanaka, K., Sano, M., Ohara, S., & Okudaira, M. (2000). *A parametric template method and its application to robust matching.* Paper presented at the IEEE Conference on Computer Vision and Pattern Recognition.

Wandell, B. A. (1995). *Foundations of Vision. Sinauer.* Sunderland, Mass.: Sinauer.

Wu, Y., Kanade, T., Li, C. C., & Cohn, J. (2000). Image registration using wavelet-based motion model. *International Journal of Computer Vision*, 38(2).

Yagi, Y., & Kawato, S. (1990). *Panoramic scene analysis with conic projection.* Paper presented at the International Conference on Robots and Systems.

Yin, W., & Boult, T. E. (2000). *Physical panoramic pyramid and noise sensitivity in pyramids.* Paper presented at the IEEE International Conference on Computer Vision and Pattern Recognition.

Zhang, Z., Deriche, R., Faugeras, O., & Luong, Q.-T. (1995). A robust technique for matching two uncalibrated images through the recovery of the unknown epipolar geometry. *Artificial Intelligence Journal*, 78, 87–119.

Therefore what is claimed is:

1. A method for simultaneously recording foveal and panoramic video streams and fusing the foveal and panoramic video streams into a single seamless display, the foveal video stream being recorded using a high-resolution video sensor and the panoramic video stream being recorded using a low-resolution video sensor, the method comprising the steps of:

a) unwarping a panoramic video stream from said low-resolution video sensor and transforming said foveal video stream from said high-resolution video sensor and said unwrapped panoramic video stream to common display coordinates;

b) fusing said transformed foveal video stream and said transformed unwrapped panoramic video stream; and c) displaying the fused video stream on a visual display means to produce a fused visual display.

2. The method according to claim 1 including directing the high-resolution video sensor by clicking on points of interest in the low-resolution portion of the display.

3. The method according to claim 1 including detecting motion in a moving object in the panoramic video stream and directing the high-resolution video sensor toward the moving object.

4. The method according to claim 1 wherein said step of fusing said transformed foveal video stream and said transformed unwrapped panoramic video stream includes blending said transformed foveal video stream and said transformed unwrapped panoramic video stream using a set of concentric alpha masks to give a high-resolution circular fovea smoothly inset within a low-resolution panoramic image.

5. The method according to claim 1 including a step of having saccades to points in the panorama where motion is detected, wherein successive panoramic RGB image pairs are differenced, rectified, and summed to form a primitive motion map, convolving said primitive motion map with a separable square kernel that approximates the field of view of the foveal sensor in panoramic coordinates, wherein said primitive motion map is a thresholded to prevent the generation of saccades due to sensor noise and vibration.

6. A method for reducing distractions from a quadrilateral boundary between low- and high-resolution video stream by smoothly blending the two in an annular region between the two, the high-resolution video stream being recorded using a high-resolution video sensor and the low-resolution video stream being recorded using a low-resolution video sensor, the method comprising the steps of:
   c) computing an annular region inscribing a quadrilateral boundary of the high-resolution image, as projected in the coordinate frame of the panoramic sensor; and
   d) blending the high- and low-resolution video streams within this annular region to yield a smooth seamless display.

7. A method for progressively mosaicking high-resolution imagery captured by a high-resolution video sensor over a low resolution image captured by a low-resolution panoramic video sensor, the method comprising the steps of:
   f) timestamping and archiving high-resolution images from previous fixations of the high-resolution video sensor;
   g) providing a formula defining a time decay memory parameter formula of high-resolution images from previous fixations of the high-resolution sensor;
   h) adjusting the contrast of pixels from previous fixations of the high-resolution sensor according to said time decay memory parameter formula;
   i) combining the contrast-adjusted high-resolution pixels with cren data from the low-resolution panoramic sensor; and
   j) adjusting the time decay memory parameter to trade off temporal and spatial resolution over a continuous range.

8. A method for estimating static homographies mapping coordinates of a high-resolution video stream to panoramic coordinates, allowing accurate fusion of data for static or distant scenes, comprising the steps of:
   c) Construction of a planar calibration rig with well-defined, high-contrast corner features
   d) recording simultaneous low- and high-resolution video frames using a low-resolution panoramic video sensor and a high-resolution video sensor of a calibration rig at regular intervals over a field-of-view of the low-resolution panoramic sensor;
   e) localizing corresponding points on the calibration rig in the high- and low-resolution images;
   f) estimating a homography for each pan/tilt position of the high-resolution video sensor; and
   g) interpolating over a resulting lattice of homographies to yield a homography relating high- and low-resolution coordinate frames at arbitrary pan/tilt angles.

9. The method according to claim 8 wherein said step of estimating a homography for each pan/tilt position of the high-resolution video sensor includes using a least-squares estimation.

10. The method according to claim 8 wherein said step of interpolating over a resulting lattice includes using a bilinear estimation procedure.

11. A method for estimating dynamic homographies mapping high-resolution to panoramic coordinates, allowing accurate fusion of data for close-range, dynamic scenes, comprising the steps of:
   a. providing a coarse registration using parametric templates over a discrete scale space on the high-resolution image and using Pearson correlation to estimate translation and scaling; and
   b. providing a staged refinement for estimating photometric, affine parameters and then a full homography, using Pearson correlation.

12. An apparatus for simultaneously recording high- and low-resolution video streams and combining these video streams into a single seamless display, comprising:
   g) a low-resolution panoramic video sensor for recording low-resolution video streams;
   h) a high-resolution video sensor for recording high-resolution video streams mounted on a motorized gimballed pan/tilt platform that permits the high-resolution sensor to be rotated about its optical centre toward any visual direction within the panoramic field of view of the low-resolution video sensor;
   i) processing means for fusing the two video streams in real time;
   j) processing means for displaying the fused video stream on a visual display means;
   k) user-interface means that allows a human user to direct the high-resolution sensor by clicking on points of interest in the low-resolution portion of the display; and
   l) processing means for detecting motion in the low-resolution video stream and directs the high-resolution sensor toward the moving object.

13. A device for panoramic sensing for visual telepresence, comprising:
   a video sensor having a panoramic field of view, a motion sensor and a display means connected to said video sensor; and
   control means connected to said video sensor, said motion sensor and said display means, said control means being operable in either a slaved mode in which an operator controls positioning of said video sensor, an autonomous mode in which saccades are determined by motion detected by said motion sensor, or a semi-autonomous mode in which saccades are determined by a combination of motion detected by said motion sensor and operator interest.

14. The device according to claim 13 wherein said video sensor includes a foveal component comprising a video camera, and wherein display duration of foveal images from past fixations is determined by a memory parameter.

15. The device according to claim 14 wherein said control means includes a calibration providing a table of projective parameter parameters, indexed by foveal pan/tilt coordinates, that allows rapid transfer of pixels between foveal and panoramic coordinate frames, including a transform means for mapping between the motion sensor and display frames produced on said display means.

16. The device according to claim 15 including alpha masking means for displaying a high resolution smoothly blended fovea embedded in lower resolution panoramic image.

* * * * *